US009264797B2

(12) United States Patent
Kanamori et al.

(10) Patent No.: US 9,264,797 B2
(45) Date of Patent: Feb. 16, 2016

(54) DIRECTIONAL MICROPHONE DEVICE, ACOUSTIC SIGNAL PROCESSING METHOD, AND PROGRAM

(71) Applicant: Panasonic Corporation, Osaka (JP)

(72) Inventors: Takeo Kanamori, Osaka (JP); Yasuhiro Terada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/379,323

(22) PCT Filed: Dec. 19, 2013

(86) PCT No.: PCT/JP2013/007474

§ 371 (c)(1),
(2) Date: Aug. 18, 2014

(87) PCT Pub. No.: WO2014/097637

PCT Pub. Date: Jun. 26, 2014

(65) Prior Publication Data

US 2015/0016629 A1 Jan. 15, 2015

(30) Foreign Application Priority Data

Dec. 21, 2012 (JP) ................................ 2012-280246
Dec. 26, 2012 (JP) ................................ 2012-283319

(51) Int. Cl.

*H04R 3/00* (2006.01)
*H04B 15/00* (2006.01)
*H04R 1/34* (2006.01)
*H04R 1/32* (2006.01)

(Continued)

(52) U.S. Cl.

CPC ............ *H04R 1/342* (2013.01); *G10L 21/0208* (2013.01); *H04R 1/326* (2013.01); *H04R 3/005* (2013.01); *G10L 2021/02165* (2013.01); *H04R 1/406* (2013.01); *H04R 2201/403* (2013.01)

(58) Field of Classification Search

None

See application file for complete search history.

(56) References Cited

U.S. PATENT DOCUMENTS 7,577,262 B2 8/2009 Kanamori et al.
8,712,770 B2 4/2014 Fukuda et al.

(Continued)

FOREIGN PATENT DOCUMENTS

| | | |
|---|---|---|
| JP | 2004-187283 | 7/2004 |
| JP | 2004-289762 | 10/2004 |
| JP | 2008-275881 | 11/2008 |
| JP | 4286637 | 7/2009 |
| WO | 2012/014451 | 2/2012 |

OTHER PUBLICATIONS

International Search Report issued Mar. 11, 2014 in corresponding International Application No. PCT/JP2013/007474.

(Continued)

*Primary Examiner* — Regina N Holder

(74) *Attorney, Agent, or Firm* — Wenderoth, Lind & Ponack, L.L.P.

(57) ABSTRACT

A directional microphone includes: a microphone which generates a first acoustic signal that has sensitivity in a target direction; a microphone which generates a second acoustic signal that has a blind spot in sensitivity in the target direction; a correction unit which multiplies, in a frequency domain, the second acoustic signal by the first acoustic signal N times, where N is greater than zero, to generate a third acoustic signal which includes the second acoustic signal that has a narrowed angular range of the blind spot in sensitivity in the target direction; and a suppression unit which performs noise suppression using the first acoustic signal as a main signal and the third acoustic signal generated as a reference signal, to generate an output acoustic signal which is the first acoustic signal that has narrowed directivity in the target direction.

19 Claims, 19 Drawing Sheets

(51) Int. Cl.

| | |
|---|---|
| ***G10L 21/0208*** | (2013.01) |
| *H04R 1/40* | (2006.01) |
| *G10L 21/0216* | (2013.01) |

(56) References Cited

U.S. PATENT DOCUMENTS

| | | | |
|---|---|---|---|
| 2004/0185804 | A1 | 9/2004 | Kanamori et al. |
| 2008/0270131 | A1 | 10/2008 | Fukuda et al. |
| 2009/0060222 | A1 | 3/2009 | Jeong et al. |
| 2009/0154728 | A1 | 6/2009 | Yuzuriha et al. |
| 2012/0177223 | A1 | 7/2012 | Kanamori et al. |

OTHER PUBLICATIONS

Extended European Search Report issued Oct. 14, 2015 in corresponding European Application No. 13865796.0.
Saeed V. Vaseghi, "Chapter 17: Speech Enhancement: Noise Reduction, Bandwidth Extension and Packet Replacement" In: "Advanced Digital Signal Processing and Noise Reduction", Oct. 1, 2009, Wiley, XP055218197, ISBN: 978-0-47-074016-3, pp. 423-466.
Hiroshi Saruwatari et al., "Speech Enhancement Using Nonlinear Microphone Array With Complementary Beamforming", ICASSP, IEEE International Conference on Acoustics, Speech and Signal Processing—Proceedings 1999 IEEE, IEEE, vol. 1, Mar. 15, 1999, pp. 69-72, XP010327935, DOI: 10.1109/ICASSP.1999.758064, ISBN: 978-0-7803-5041-0.

DIRECTIONAL MICROPHONE DEVICE, ACOUSTIC SIGNAL PROCESSING METHOD, AND PROGRAM

TECHNICAL FIELD

The present invention relates to a directional microphone device, an acoustic signal processing method, and a program.

BACKGROUND ART

Directional microphone devices are proposed which suppress sound that is from directions other than a target direction and included in a main signal, using a main signal which has the principal axis of directivity in the target direction and a reference signal which has, ideally, zero sensitivity in the target direction and a fixed angular range of a blind spot in sensitivity (e.g., Patent Literature [PTL] 1).

CITATION LIST

Patent Literature

[PTL 1] Japanese Patent Publication No. 4286637
[PTL 2] Japanese Unexamined Patent Application Publication No. 2004-187283
[PTL 3] International Publication WO2012/014451

SUMMARY OF INVENTION

Technical Problem

A conventional configuration as disclosed in PTL 1 cannot form directivity that has a sufficiently narrow directional angle in a target direction. Thus, the conventional configuration has a problem that sound (sound other than target sound) from directions other than the target direction (other than in front of a microphone) is also picked up.

The present invention addresses the above problem and has an object to provide a directional microphone device, acoustic signal processing method, and program, which can form directivity that has a narrow directional angle in a target direction.

Solution to Problem

To achieve the above object, a directional microphone device according to one aspect of the present invention is a directional microphone device, including: a first directivity synthesis unit configured to generate a first acoustic signal having sensitivity in a target direction; a second directivity synthesis unit configured to generate a second acoustic signal having a blind spot in sensitivity in the target direction; a correction unit configured to multiply, in a frequency domain, the second acoustic signal generated by the second directivity synthesis unit by the first acoustic signal generated by the first directivity synthesis unit N times, to generate a third acoustic signal having a narrower angular range of the blind spot in sensitivity in the target direction than the second acoustic signal, where the N is greater than zero; and a suppression unit configured to perform noise suppression using the first acoustic signal generated by the first directivity synthesis unit as a main signal and the third acoustic signal generated by the correction unit as a reference signal to generate an output acoustic signal which is the first acoustic signal that has narrowed directivity in the target direction.

These general and specific aspects may be implemented in a system, a method, an integrated circuit, a computer program, or a computer-readable recording medium such as a CD-ROM, or any combination of systems, methods, integrated circuits, computer programs, and computer-readable recording media.

Advantageous Effects of Invention

The directional microphone devices according to the present invention can form directivity that has a narrow directional angle in a target direction.

DESCRIPTION OF EMBODIMENTS (Underlying Knowledge Forming Basis of the Present Invention)

First, a conventional directional microphone device disclosed in PTL 1, which can suppress sound from directions other than a target direction will be described. Herein, the target sound direction refers to a principal axis of directivity of the directional characteristics of the microphone device.

Figure 21:
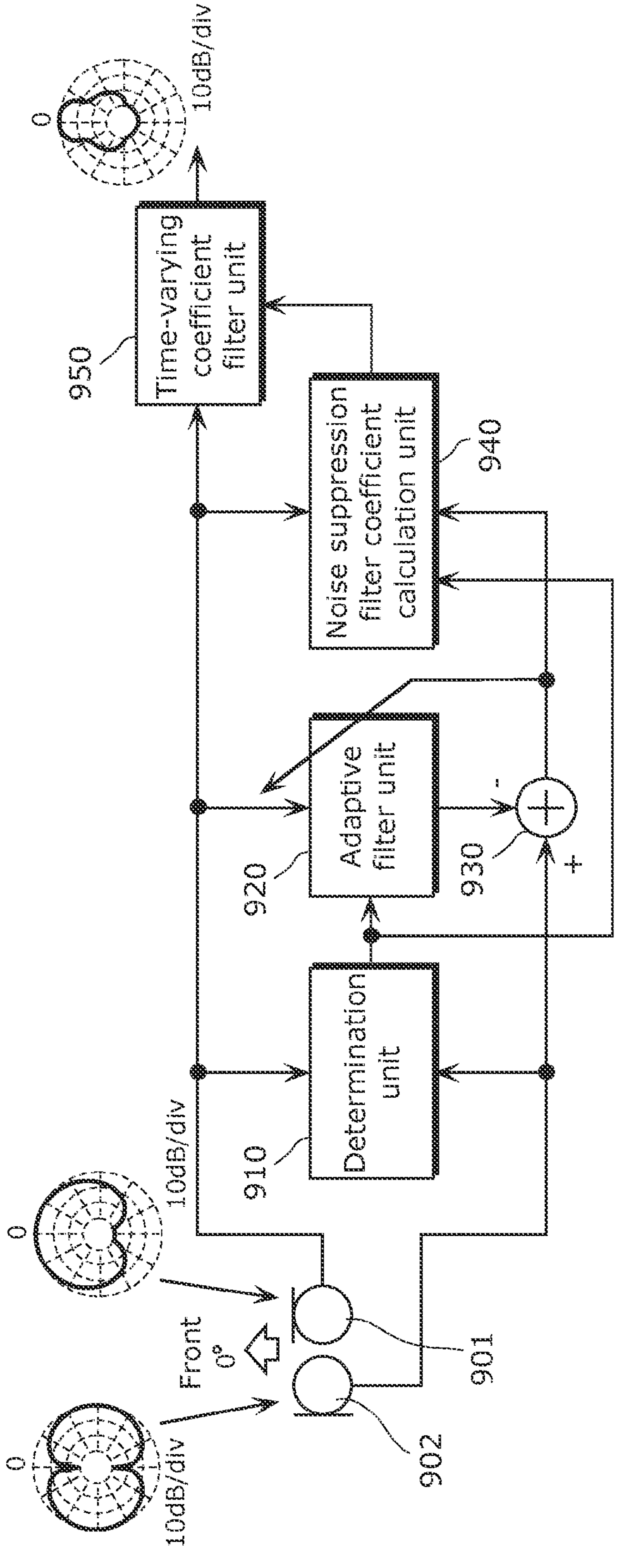
FIG. 21 is a diagram showing an example of a configuration of a conventional directional microphone device.

FIG. 21 is a diagram showing an example of a configuration of a conventional directional microphone device.

The directional microphone device shown in FIG. 21 includes a first microphone unit 901, a second microphone unit 902, a determination unit 910, an adaptive filter unit 920, a signal subtraction unit 930, a noise suppression filter coefficient calculation unit 940, and a time-varying coefficient filter unit 950.

The directional microphone device shown in FIG. 21, first, performs frequency analysis on a pressure-gradient main signal output from the first microphone unit 901 and a pressure-gradient reference signal output from the second microphone unit 902. The pressure-gradient main signal has the principal axis of directivity in a target direction. The pressure-gradient reference signal has a blind spot in sensitivity in the target direction. Next, the noise suppression filter coefficient calculation unit 940 estimates power spectra of sound that is from directions other than the target direction and is included in the main signal, based on power spectra of the main signal and the reference signal, and calculates a filter coefficient for suppressing the sound from the directions other than the target direction, based on the estimated power spectra. Then, the time-varying coefficient filter unit 950 filters the main signal to suppress sound from the directions other than the target direction, thereby enhancing sound from the target direction.

However, the conventional configuration employs a pressure-gradient directivity synthesis technique for the reference signal, and thus it is difficult to form a sufficiently narrow blind spot in sensitivity in the target direction (form the angular range to sufficiently narrow). In other words, in the conventional configuration, sound to be suppressed near the target direction is not included in the reference signal. Thus, the noise suppression filter coefficient calculation unit 940 cannot calculate coefficients for suppressing sound near a target sound.

In other words, conventional configurations as disclosed in PTL 1, for example, cannot form directivity that has a sufficiently narrow directional angle in the target direction. Thus, there arises a problem that sound (sound other than the target sound) from directions other than the target direction (directions other than in front of a microphone) is also picked up.

Moreover, for example, PTL 2 discloses a technique of enhancing sound from a target sound direction. In a directional microphone device disclosed in PTL 2, assuming that an output signal from a first directional microphone that has the sensitivity in the target sound direction is a main signal and an output signal from a second directional microphone that has a blind spot in sensitivity in the target sound direction is a reference signal, a filter coefficient for suppressing sound from directions other than the target sound direction is calculated using the power spectra of the main signal and the reference signal respectively from the first directional microphone and the second directional microphone and filtering the main signal to enhance the sound from the target sound direction.

In the configuration disclosed in PTL 2, the reference signal satisfies the criteria for a reference signal, that is, the reference signal has a blind spot in sensitivity in the target sound direction and does not include signal components of the target sound in the relationship between directional patterns of the directional microphones respectively used for the main signal and the reference signal. However, directional patterns in directions other than the target sound direction do not coincide between the main signal and the reference signal. Here, the directional pattern shows characteristics of pressure sensitivity-to-acoustic wave direction-of-arrival of the microphone. When noise sources are present in a plurality of directions other than the target sound direction due to unconformity in directional pattern between the main signal and the reference signal, it is necessary to estimate a best-suited suppression coefficient, adaptively in accordance with the respective directions of the noise sources. Due to this, the accuracy in estimating the signal components of the reference signal to be suppressed, which mix with the main signal, is a factor that contributes the limitation of the microphone performance.

Thus, one aspect of the present invention addresses the above problem and has an object to provide a directional microphone device, acoustic signal processing method, and acoustic signal processing program, which can form directivity that has a narrow directional angle in a target direction.

To solve such problems, a directional microphone device according to one aspect of the present invention is a directional microphone device, including: a first directivity synthesis unit configured to generate a first acoustic signal having sensitivity in a target direction; a second directivity synthesis unit configured to generate a second acoustic signal having a blind spot in sensitivity in the target direction; a correction unit configured to multiply, in a frequency domain, the second acoustic signal generated by the second directivity synthesis unit by the first acoustic signal generated by the first directivity synthesis unit N times, to generate a third acoustic signal having a narrower angular range of the blind spot in sensitivity in the target direction than the second acoustic signal, where the N is greater than zero; and a suppression unit configured to perform noise suppression using the first acoustic signal generated by the first directivity synthesis unit as a main signal and the third acoustic signal generated by the correction unit as a reference signal to generate an output acoustic signal which is the first acoustic signal that has narrowed directivity in the target direction.

This allows implementation of a directional microphone device which can form directivity having a narrow directional angle in a target direction.

Specifically, according to the directional microphone device of the present aspect, the angular range of the blind spot in sensitivity in the target direction of the reference signal can be narrowed and sound near the target direction can be included in the reference signal. This allows the directivity having a narrow directional angle to be formed in the target direction. Moreover, according to the directional microphone device of the present aspect, the reference signal can be corrected to allow highly precise estimation of noise components. Thus, the directivity can be narrowed and improved sound quality can be obtained as well.

Moreover, for example, the first directivity synthesis unit and the second directivity synthesis unit may process an output signal of a microphone array including a plurality of microphones to generate the first acoustic signal and the second acoustic signal, respectively.

Moreover, for example, the directional microphone device may further include a first conversion unit configured to convert the first acoustic signal generated by the first directivity synthesis unit and the second acoustic signal generated by the second directivity synthesis unit into frequency-domain signals, wherein the correction unit may multiply the second acoustic signal converted by the first conversion unit into the frequency-domain signal by the first acoustic signal converted by the first conversion unit into the frequency-domain signal the N times, to generate the third acoustic signal, where the N is greater than zero.

Moreover, for example, the N may be 1, and the correction unit may include: a spectral multiplication unit configured to complex multiply the second acoustic signal converted into a frequency-domain signal by the first acoustic signal converted into a frequency-domain signal; an absolute value operation unit configured to calculate an absolute value of an output signal of the spectral multiplication unit; and a square root calculation unit configured to calculate a square root of the absolute value calculated by the absolute value operation unit, to generate the third acoustic signal.

Moreover, for example, the N may be 1, and the correction unit may include: an absolute value operation unit configured to calculate a first absolute value of the first acoustic signal converted into a frequency-domain signal and a second absolute value of the second acoustic signal converted into a frequency-domain signal; a multiplier unit configured to multiply the first absolute value and the second absolute value calculated by the absolute value operation unit; and a square root calculation unit configured to calculate a square root of a multiplication value which is obtained by the multiplier unit multiplying the first absolute value and the second absolute value, to generate the third acoustic signal.

Moreover, for example, the suppression unit may include: a noise suppression coefficient calculation unit configured to calculate a noise suppression coefficient for suppressing noise included in the first acoustic signal, using power spectra of the first acoustic signal and the third acoustic signal, the noise being sound from directions other than the target direction; and a noise suppression unit configured to perform the noise suppression which includes applying the noise suppression coefficient calculated by the noise suppression coefficient calculation unit to the first acoustic signal generated by the first directivity synthesis unit to suppress the noise and extracting only sound from the target direction, to generate the output acoustic signal.

Moreover, for example, the directional microphone device may further include a power spectrum calculation unit configured to calculate a power spectrum of the first acoustic signal converted into the frequency-domain signal and a power spectrum of the third acoustic signal, wherein the suppression unit may perform the noise suppression using one of the first acoustic signal and the first acoustic signal converted by the first conversion unit into the frequency-domain signal and the power spectrum of the first acoustic signal calculated by the power spectrum calculation unit as main signals and the power spectrum of the third acoustic signal calculated by the power spectrum calculation unit as a reference signal, to generate the output acoustic signal.

Moreover, for example, the power spectrum calculation unit may raise an absolute value of the third acoustic signal generated by the correction unit to a power of $(2/(N+1))$ to calculate the power spectrum of the third acoustic signal.

Moreover, for example, the suppression unit may include: a first coefficient multiplication unit configured to multiply the power spectrum of the third acoustic signal by a predetermined coefficient to output as an output signal; a first subtractor unit configured to subtract the output signal of the first coefficient multiplication unit from the power spectrum of the first acoustic signal; a noise suppression coefficient calculation unit configured to calculate a noise suppression coefficient for suppressing noise included in the first acoustic signal, using the power spectrum of the first acoustic signal and an output signal of the first subtractor unit as input, the noise being sound from directions other than the target direction; and a noise suppression processing unit configured to perform the noise suppression, using, as input, one of the first acoustic signal and the first acoustic signal converted by the first conversion unit into the frequency-domain signals and the noise suppression coefficient calculated by the noise suppression coefficient calculation unit, to generate the output acoustic signal.

Moreover, for example, the directional microphone device may further include a beam-width control unit configured to change the N, which is the number of times of multiplication performed by the correction unit, and a value of the N in the power of $(2/(N+1))$ used by the power spectrum calculation unit, to control directivity of the directional microphone device.

Moreover, for example, the N may be a real number greater than zero.

Moreover, for example, the directional microphone device may further include a power spectrum calculation unit configured to calculate a power spectrum of the first acoustic signal converted into the frequency-domain signal and a power spectrum of the third acoustic signal, wherein the noise suppression coefficient calculation unit may calculate the noise suppression coefficient, using the power spectrum of the first acoustic signal calculated by the power spectrum calculation unit as a main signal and the power spectrum of the third acoustic signal calculated by the power spectrum calculation unit as a reference signal.

Moreover, for example, the directional microphone device may further include a third directivity synthesis unit configured to generate a fourth acoustic signal having a blind spot in sensitivity in the target direction and a directional pattern different from the second acoustic signal, wherein the suppression unit may further include: a counter-direction noise suppression unit configured to suppress a first noise included in the third acoustic signal, using the third acoustic signal generated by the correction unit as a main signal and the fourth acoustic signal generated by the third directivity synthesis unit as a reference signal, the first noise being sound in a direction opposite from the target direction; a noise suppression coefficient calculation unit configured to calculate a noise suppression coefficient for suppressing noise, including the first noise, using the first acoustic signal, the fourth acoustic signal, and an output signal of the counter-direction noise suppression unit, the noise being sound from directions other than the target direction; and a noise suppression unit configured to perform the noise suppression which includes applying the noise suppression coefficient calculated by the noise suppression coefficient calculation unit to the first acoustic signal generated by the first directivity synthesis unit to suppress the noise and extracting only sound from the target direction, to generate the output acoustic signal.

Moreover, for example, the directional microphone device may further include: a first conversion unit configured to convert the first acoustic signal generated by the first directivity synthesis unit, the second acoustic signal generated by the second directivity synthesis unit, and the fourth acoustic signal generated by the third directivity synthesis unit into frequency-domain signals; and a power spectrum calculation unit configured to calculate power spectra of the first acoustic signal, the third acoustic signal, and the fourth acoustic signal converted by the first conversion unit into the frequency-domain signals, wherein the counter-direction noise suppression unit may suppress the first noise, using the power spectrum of the third acoustic signal as a main signal and the power spectrum of the fourth acoustic signal as a reference signal.

Moreover, for example, the noise suppression coefficient calculation unit may calculate the noise suppression coefficient, using the power spectrum of the first acoustic signal as a main signal and the output signal of the counter-direction noise suppression unit and the power spectrum of the fourth acoustic signal as reference signals.

Moreover, for example, the noise suppression unit may include: a multiplier which multiplies the first acoustic signal converted into a frequency-domain signal by the noise suppression coefficient calculated by the noise suppression coefficient calculation unit to extract only a target acoustic signal in the target direction from which the noise has been suppressed; and an inverse Fourier transform unit configured to convert the target acoustic signal extracted by the multiplier into a time-domain signal to generate the output acoustic signal.

Moreover, for example, the noise suppression unit may include: a second conversion unit configured to convert the noise suppression coefficient, which is a frequency-domain coefficient, into a time-domain coefficient of an FIR filter; and a time-varying coefficient FIR filter unit configured to update the time-domain coefficient of the FIR filter converted by the second conversion unit one unit of time prior, with the coefficient of the FIR filter converted by the second conversion unit at a current unit of time, and filter the first acoustic signal generated by the first directivity synthesis unit, to generate the output acoustic signal.

Moreover, to solve such problems, an acoustic signal processing method one aspect of the present invention is an acoustic signal processing method, including: (a) generating a first acoustic signal having sensitivity in a target direction; (b) generating a second acoustic signal having a blind spot in sensitivity in the target direction; (c) multiplying, in a frequency domain, the second acoustic signal generated in step (b) by the first acoustic signal generated in step (a) N times, to generate a third acoustic signal having a narrower angular range of the blind spot in sensitivity in the target direction than the second acoustic signal, where the N is greater than zero; and (d) performing noise suppression using the first acoustic signal generated in step (a) as a main signal and the third acoustic signal generated in step (c) as a reference signal to generate an output acoustic signal which is the first acoustic signal that has narrowed directivity in the target direction.

These general and specific aspects may be implemented in a system, a method, an integrated circuit, a computer program, or a computer-readable recording medium such as a CD-ROM, or any combination of systems, methods, integrated circuits, computer programs, or computer-readable recording media such as CD-ROM.

Hereinafter, the directional microphone devices according to one aspect of the present invention will be described in detail, with reference to the accompanying drawings.

It should be noted that embodiments described below are each merely a preferred illustration of the present invention. Values, shapes, materials, components, arrangement or connection between the components, steps, and the order of the steps are merely illustrative, and are not intended to limit the present invention. Moreover, among components of the embodiments below, components not set forth in the independent claims indicating the top level concept of the present invention will be described as optional components.

(Embodiment 1)

Figure 1:
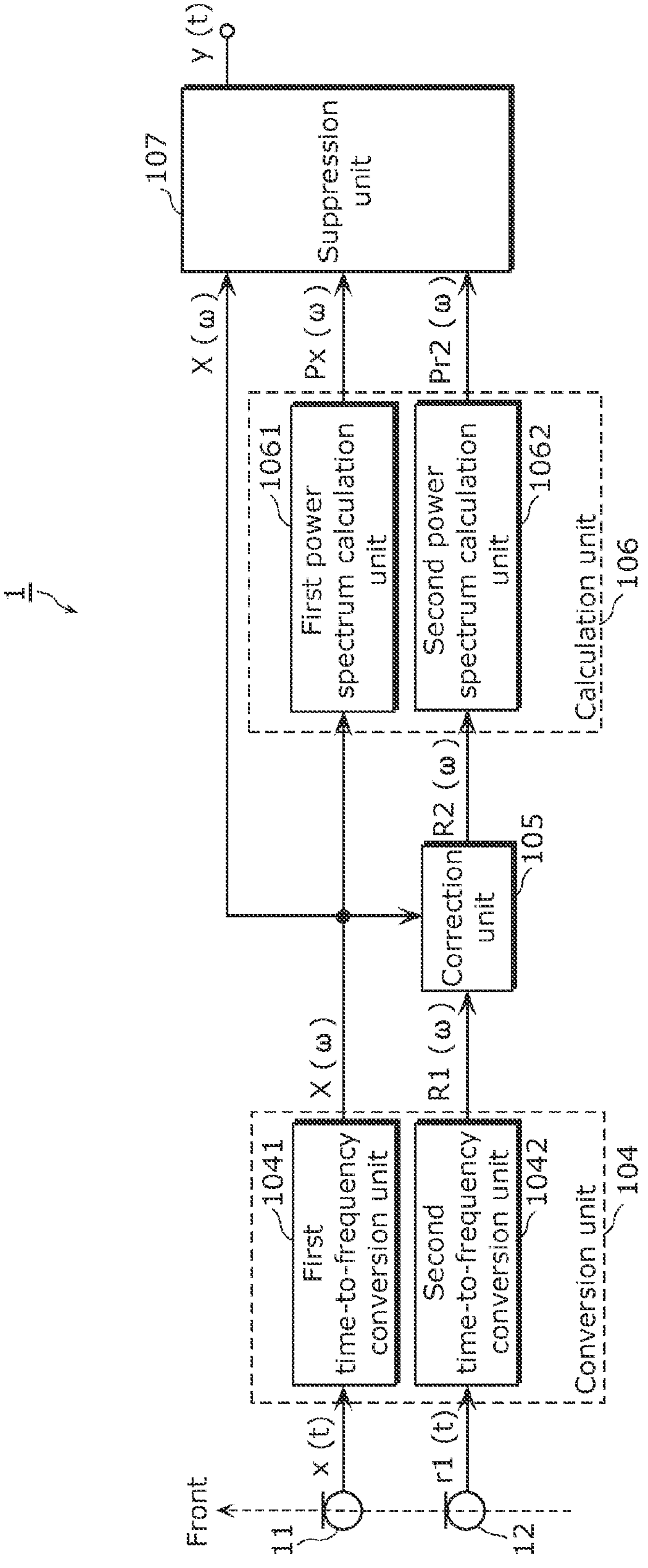
FIG. 1 is a diagram showing an example of a configuration of a directional microphone device according to an embodiment 1.

FIG. 1 is a diagram showing an example of a configuration of a directional microphone device according to an embodiment 1. A directional microphone device 1 shown in FIG. 1 includes a first microphone 11, a second microphone 12, a conversion unit 104, a correction unit 105, a calculation unit 106, and a suppression unit 107.

The first microphone 11 is by way of example of a first directivity synthesis unit. The first microphone 11 generates a first acoustic signal that has sensitivity in a target direction. In the present embodiment, the first microphone has sensitivity characteristics of having sensitivity in a target sound direction, and coverts an acoustic wave into an electrical signal to output a main signal x (t) as an output signal. Here, having the sensitivity in the target direction refers to having peak sensitivity in the target direction in terms of sensitivity characteristics. It should be noted that the first microphone 11 may include one or more microphones (a microphone array), and a first directivity synthesis unit which processes an output signal of the microphone array to generate a first acoustic signal (the main signal x (t)) that has the sensitivity in the target direction.

The second microphone 12 is by way of example of a second directivity synthesis unit. The second microphone 12 generates a second acoustic signal which has a blind spot in sensitivity in the target direction. In the present embodiment, the second microphone 12 has sensitivity characteristics of having a blind spot in sensitivity in the target sound direction, converts an acoustic wave into an electrical signal to output a reference signal r1 (t) as an output signal. It should be noted that the second microphone 12 may include one or more microphones (a microphone array), and a second directivity synthesis unit which processes an output signal of the microphone array to generate a second acoustic signal (the reference signal r1 (t)) that has the blind spot in sensitivity in the target direction.

The conversion unit 104 is by way of example of a first conversion unit. The conversion unit 104 converts the first acoustic signal (the main signal x (t)) generated by the first microphone 11 and the second acoustic signal (the reference signal r1 (t)) generated by the second microphone 12 into frequency-domain signals.

In the present embodiment, as shown in FIG. 1, the conversion unit 104 includes a first time-to-frequency conversion unit 1041 and a second time-to-frequency conversion unit 1042. The first time-to-frequency conversion unit 1041 converts a time-domain signal into a frequency-domain signal, using the main signal x (t) from the first microphone 11 as input, to output a main signal spectrum X (ω). The second time-to-frequency conversion unit 1042 converts a time-domain signal into a frequency-domain signal, using the reference signal r1 (t) from the second microphone 12 as input, to output a first reference signal spectrum R1 (ω).

The correction unit 105 multiplies, in a frequency domain, the second acoustic signal generated by the second microphone 12 by the first acoustic signal generated by the first microphone 11 N times (N>0), to generate a third acoustic signal that has a narrower angular range of the blind spot in sensitivity in the target direction than the second acoustic signal. More specifically, the correction unit 105 multiplies the second acoustic signal (R1 (ω)) converted by the conversion unit 104 into the frequency-domain signal by the first acoustic signal (X (ω)) converted by the conversion unit 104 into the frequency-domain signal N times (N>0), to generate the third acoustic signal.

In the present embodiment, the correction unit 105 outputs a corrected second reference signal spectrum R2 (ω), using the main signal spectrum X (ω) from the first time-to-frequency conversion unit 1041 and the first reference signal spectrum R1 (ω) from the second time-to-frequency conversion unit 1042 as input.

Figure 2:
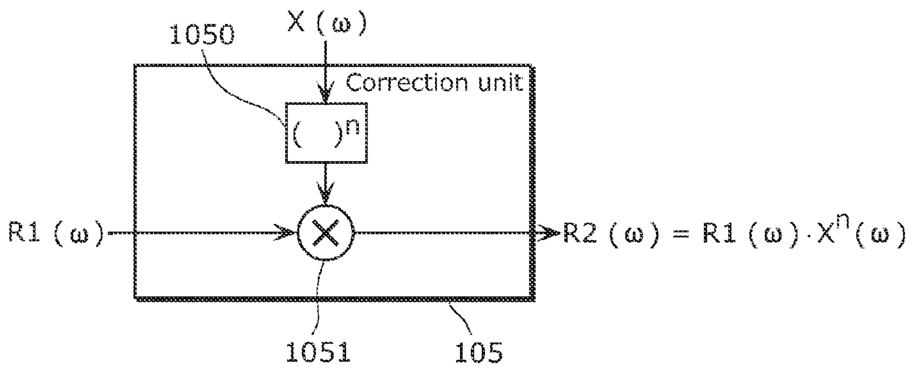
FIG. 2 is a diagram showing an example of a configuration of a correction unit according to the embodiment 1.

Hereinafter, an example of a configuration of the correction unit 105 will be described, with reference to FIG. 2. FIG. 2 is a diagram showing an example of the configuration of the correction unit according to the embodiment 1.

For example, as shown in FIG. 2, the correction unit 105 includes an operation unit 1050 and a spectral multiplication unit 1051, and performs the equation indicated in (Eq. 1).

$$R2(\omega)=R1(\omega)\cdot X(\omega)\hat{}N \quad \text{(Eq. 1)}$$

In other words, the spectral multiplication unit 1051 multiplies the second acoustic signal (R1 (ω)) converted into the frequency-domain signal by the first acoustic signal (X (ω)) converted into the frequency-domain signal N times (N>0).

The calculation unit 106 is by way of example of a power spectrum calculation unit. The calculation unit 106 calculates respective power spectra of the first acoustic signal and the third acoustic signal converted into the frequency-domain signals. The calculation unit 106 raises an absolute value of the third acoustic signal (R2 (ω)) generated by the correction unit 105 to the power of (2/[N+1]) to calculate a power spectrum (Pr2 (ω)) of the third acoustic signal.

In the present embodiment, as shown in FIG. 1, the calculation unit 106 includes a first power spectrum calculation unit 1061 and a second power spectrum calculation unit 1062. The first power spectrum calculation unit 1061 receives input of the main signal spectrum X (ω) from the first time-to-frequency conversion unit 1041 and outputs a main signal power spectrum Px (ω). The second power spectrum calculation unit 1062 receives input of the second reference signal spectrum R2 (ω) from the correction unit 105 and outputs a second reference signal power spectrum Pr2 (ω).

The suppression unit 107 performs noise suppression using the first acoustic signal generated by the first microphone 11 as a main signal and the third acoustic signal generated by the correction unit 105 as a reference signal to generate an output acoustic signal which includes the first acoustic signal that has a narrowed angle of the directivity in the target direction. More specifically, the suppression unit 107 performs noise suppression, using the first acoustic signal (X (ω)) converted by the conversion unit 104 into the frequency-domain signal and the power spectrum (Px (ω)) of the first acoustic signal calculated by the calculation unit 106 as main signals and the power spectrum (Pr2 (ω)) of the third acoustic signal calculated by the calculation unit 106 as a reference signal, to generate the output acoustic signal.

In the present embodiment, the suppression unit 107 receives input of the main signal spectrum X (ω) from the first time-to-frequency conversion unit 1041, the main signal power spectrum Px (ω) from the first power spectrum calculation unit 1061, and the second reference signal power spectrum Pr2 (ω) from the second power spectrum calculation unit 1062, and outputs output y (t) of the directional microphone device 1.

Figure 3:
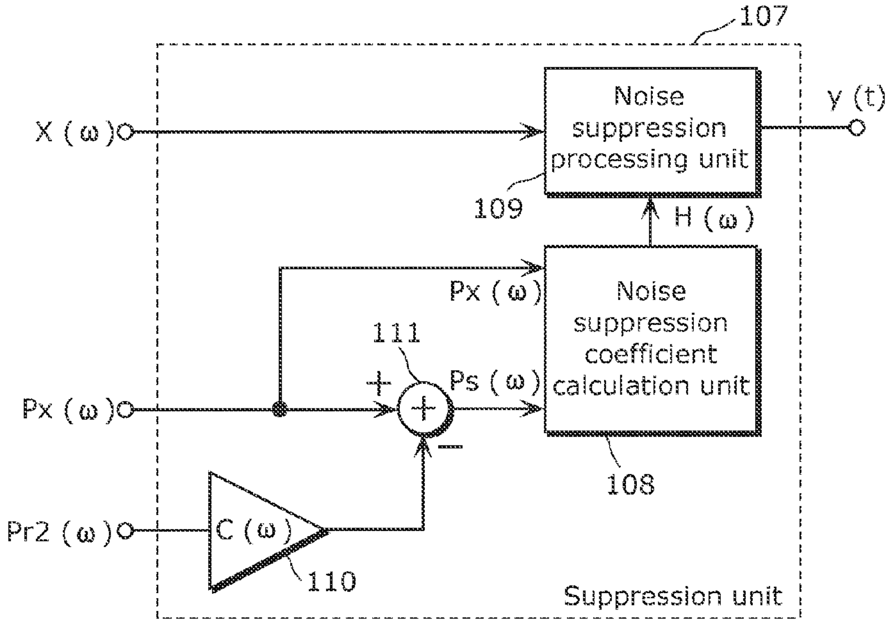
FIG. 3 is a diagram showing an example of a configuration of a suppression unit according to the embodiment 1.

Hereinafter, an example of a configuration of the suppression unit 107 will be described, with reference to FIG. 3. FIG. 3 is a diagram showing an example of the configuration of a noise suppression unit according to the embodiment 1.

The suppression unit 107, as shown in FIG. 3, includes a first coefficient multiplication unit 110, a first subtractor unit 111, a noise suppression coefficient calculation unit 108, and a noise suppression processing unit 109.

The first coefficient multiplication unit 110 multiplies the power spectrum (Pr2 (ω)) of the third acoustic signal by a predetermined coefficient (a coefficient C (ω)) and outputs a result obtained therefrom. Specifically, the first coefficient multiplication unit 110 receives input of the second reference signal power spectrum Pr2 (ω) from the second power spectrum calculation unit 1062, multiplies the second reference signal power spectrum Pr2 (ω) by the coefficient C (ω), and outputs a third reference signal power spectrum Pr3 (ω). The predetermined coefficient, that is, the coefficient C (ω) may be a predefined constant or a variable which varies over time or at predetermined timing.

The first subtractor unit 111 subtracts the output signal (Pr3 (ω)) of the first coefficient multiplication unit 110 from the power spectrum (Px (ω)) of the first acoustic signal. Specifically, the first subtractor unit 111 subtracts the third reference signal power spectrum Pr3 (ω), which is from the first coefficient multiplication unit 110, from the main signal power spectrum Px (ω), which is from the first power spectrum calculation unit 1061, and outputs an estimated target sound power spectrum Ps (ω).

Using the power spectrum (Px (ω)) of the first acoustic signal and the output signal (Ps (ω)) of the first subtractor unit 111 as input, the noise suppression coefficient calculation unit 108 calculates a noise suppression coefficient (H (ω)) for suppressing noise which is sound that is included in the first acoustic signal and other than sound from the target direction. Specifically, the noise suppression coefficient calculation unit 108 receives input of the main signal power spectrum Px (ω) from the first power spectrum calculation unit 1061 and the estimated target sound power spectrum Ps (ω) from the first subtractor unit 111, and outputs the noise suppression coefficient H (ω).

The noise suppression processing unit 109 receives input of the first acoustic signal (X (ω)) converted by the conversion unit 104 into the frequency-domain signal and the noise suppression coefficient (H (ω)) calculated by the noise suppression coefficient calculation unit 108, and performs the noise suppression process on the first acoustic signal (X (ω)) using the noise suppression coefficient (H (ω)) to generate an output acoustic signal (y (t)). Specifically, using the main signal spectrum X (ω) from the first time-to-frequency conversion unit 1041 and the noise suppression coefficient H (ω) from the noise suppression coefficient calculation unit 108 as input, the noise suppression processing unit 109 suppresses signal components of the main signal spectrum X (ω), which are noises, from directions other than the target sound direction, extracts a target sound from the principal direction of the directivity, and outputs the output y (t).

Operation of the directional microphone device 1 configured as set forth above will be described.

The following description will be given, assuming that the target sound direction is the principal axis direction (the frontal direction of the directional microphone device) of directivity formed by the directional microphone device. The frequency-domain signals are denoted by x (t) or (t), for example, and the frequency-domain signals are denoted by X (ω) or (ω), for example. Regarding the description of directivity, the directional pattern of the signal X (ω) represents the acoustic wave direction-of-arrival θ-to-pressure-sensitivity characteristics in a frequency ω of the signal X, and graphs of directional patterns are illustrated in polar pattern.

Figure 4A:
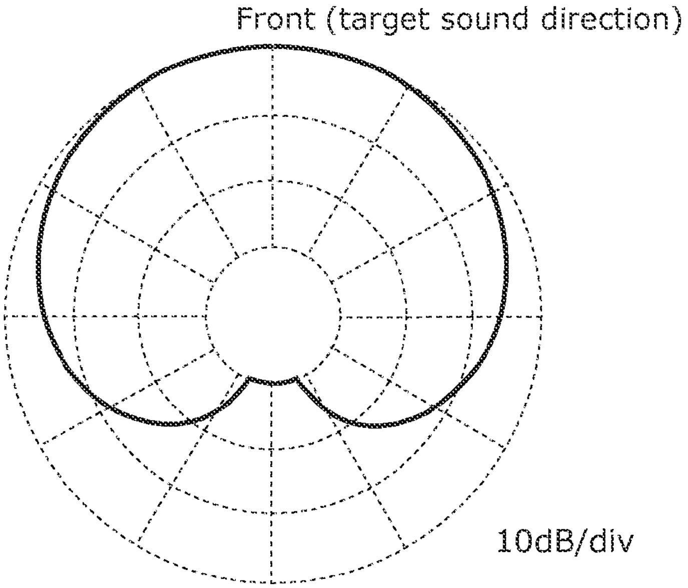
FIG. 4A is a graph illustrating a directional pattern of a first microphone according to the embodiment 1.
Figure 4B:
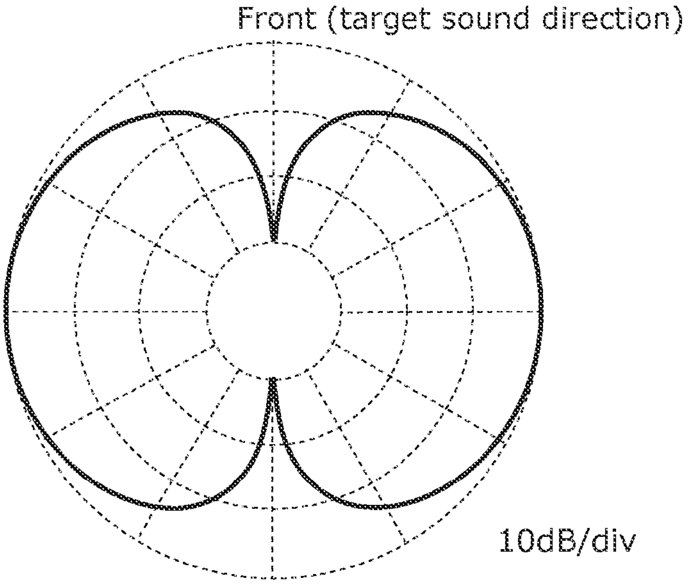
FIG. 4B is a graph illustrating a directional pattern of a second microphone according to the embodiment 1.

FIG. 4A is a graph illustrating a directional pattern of the first microphone according to the embodiment 1. FIG. 4B is a graph illustrating a directional pattern of the second microphone according to the embodiment 1.

The first microphone 11 has the directional characteristics of having the sensitivity in the target sound direction, for example, the directional pattern (the graph of the directional characteristics) illustrated in FIG. 4A. The directional pattern illustrated in FIG. 4A indicates first-order pressure-gradient unidirectivity which is generally used to pick up sound from the frontal direction of the first microphone 11. The directional microphone device 1 shown in FIG. 1 performs later processing on the main signal to narrow (the angle of) the directivity using the output signal x (t) from the first microphone 11 as the main signal, thereby increasing selectivity of sound. The later processing is a process of noise suppression based on power spectra respectively generated from the main signal x (t) and the reference signal r1 (t).

The second microphone 12 has the directional characteristics of having a blind spot in sensitivity in the target sound direction, for example, the directional pattern shown in FIG. 4B. The directional pattern illustrated in FIG. 4B indicates first-order pressure-gradient bidirectivity that has a blind spot in sensitivity in front of the second microphone 12 which is the target sound direction. The directional microphone device 1 narrows the directivity of the main signal, using the output signal r1 (t) from the second microphone 12 as the reference signal. The frequency in the directional pattern graph, herein, is calculated to be 1 kHz but is not limited to a particular frequency insofar as the above criteria for the directional patterns of the first microphone 11 and the second microphone 12 are met.

For example, using operations such as FFT operation or filter-bank operations, the first time-to-frequency conversion unit 1041 and the second time-to-frequency conversion unit 1042, respectively, convert the main signal x (t) and the reference signal r1 (t) into respective frequency spectrum signals and output the main signal spectrum X (ω) and the first reference signal spectrum R1 (ω).

The first power spectrum calculation unit 1061 performs the following operation on the main signal spectrum X (ω) for each frequency component to output the main signal power spectrum Px (ω).

$$Px(\omega)=|X(\omega)|\hat{\ }2 \qquad \text{(Eq. 2)}$$

The correction unit 105 receives input of the main signal spectrum X (ω) from the first time-to-frequency conversion unit 1041 and the first reference signal spectrum R1 (ω) from the second time-to-frequency conversion unit 1042. To approximate the directional pattern to an ideal shape, the correction unit 105 performs correction indicated in (Eq. 3) on the reference signal spectrum R1 (ω) for each frequency ω to output the second reference signal spectrum R2 (ω). Details of the correction will be described below.

$$R2(\omega)=R1(\omega)\cdot X(\omega)\hat{\ }N \qquad \text{(Eq. 3)}$$

Indicated in (Eq. 3) is multiplying the first reference signal spectrum R1 (ω) by the main signal spectrum X (ω) N times, where N>0, that is, N is a real number greater than 0.

The second power spectrum calculation unit 1062 converts, into order of power, the dimensionality of the second reference signal spectrum R2 (ω) corrected by the correction unit 105. Specifically, since the spectrum is multiplied N+1 times, the correction unit 105 performs the operation indicated in (Eq. 4) to convert the dimensionality into order of power (square) and output the reference signal power spectrum Pr2 (ω).

$$Pr2(\omega)=|R2(\omega)|\hat{\ }(2/(N+1)) \qquad \text{(Eq. 4)}$$

The suppression unit 107 suppresses from the main signal the signal components in directions other than the target sound direction, based on the main signal power spectrum Px (ω) and the second reference signal power spectrum Pr2 (ω), to extract a target sound that has the directivity in the principal axis direction and output as the output y (t). More specifically, for example, as shown in FIG. 3, the first coefficient multiplication unit 110 multiplies the second reference signal power spectrum Pr2 (ω) by C (ω) (times a factor) as indicated in (Eq. 5) to outputs Pr3 (ω) the level of which has been adjusted. The first subtractor unit 111 subtracts Pr3 (ω) from the main signal power spectrum Px (ω) as indicated in (Eq. 6) to output to the noise suppression coefficient calculation unit 108 the estimated target sound power spectrum Ps (ω) generated.

$$Pr3(\omega)=C(\omega)\cdot Pr2(\omega) \qquad \text{(Eq. 5)}$$

$$Ps(\omega)=Px(\omega)-Pr3(\omega) \qquad \text{(Eq. 6)}$$

Figure 5A:
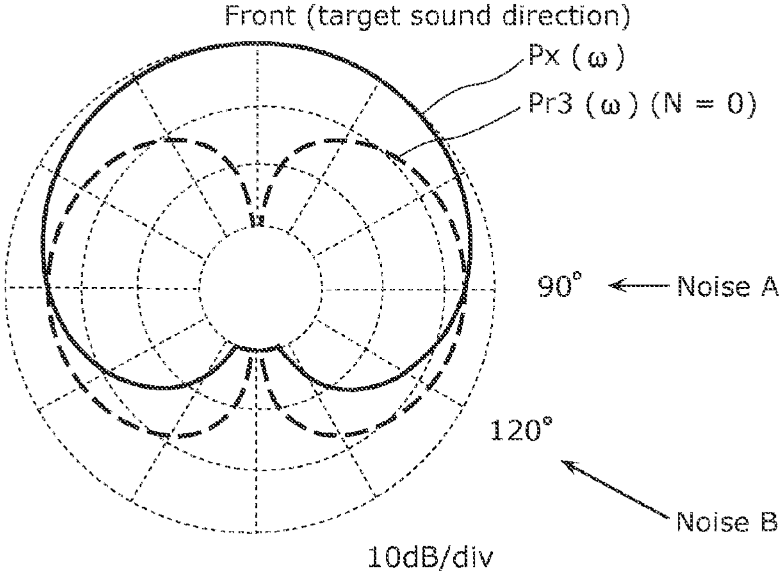
FIG. 5A is a graph illustrating a relationship between directional patterns of a main signal power spectrum Px (ω) and a third reference signal power spectrum Pr3 (ω) when N=0 in the embodiment 1.

FIG. 5A shows the directional pattern of the main signal power spectrum Px (ω) in a solid line, the directional pattern of the third reference signal power spectrum Pr3 (ω), the level of which has been adjusted by multiplying Pr2 (ω) by the coefficient C (ω), in dashed lines. In the following, description will be given, assuming that N in (Eq. 3) and (Eq. 4) are as indicated in (Eq. 7).

$$N=0 \qquad \text{(Eq. 7)}$$

where the conditions for (Eq. 7) correspond to those of the conventional configuration.

Figure 5B:
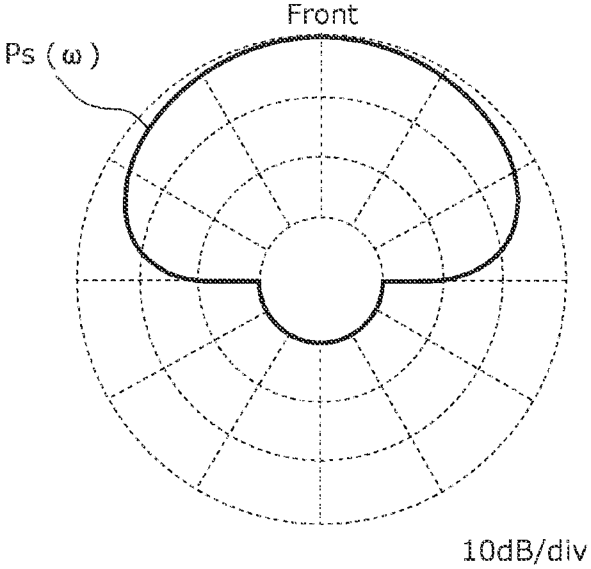
FIG. 5B is a graph illustrating a directional pattern of an estimated target sound power spectrum Ps (ω) when N=0 in the embodiment 1.

FIG. 5A is a graph illustrating a relationship between the directional patterns of the main signal power spectrum Px (ω) and the third reference signal power spectrum Pr3 (ω) when N=0 in the embodiment 1. FIG. 5B is a graph illustrating the directional pattern of the estimated target sound power spectrum Ps (ω) when N=0 in the embodiment 1.

More specifically, the directional patterns illustrated in FIG. 5A indicate a case where the coefficient C (ω) is set so that the main signal power spectrum Px (ω) (the solid line) and the third reference signal power spectrum Pr3 (ω) (the dashed lines) coincide in a direction of a noise A present in the 90 degree direction. The directional pattern shown in FIG. 5B indicates the estimated target sound power spectrum Ps (ω) obtained by subtracting the third reference signal power spectrum Pr3 (ω) from the main signal power spectrum Px (ω) according to (Eq. 6), provided that when the subtraction results a negative value, the calculation is made with the value being zero.

The estimated target sound power spectrum Ps (ω) shown in FIG. 5B is a power spectrum that is obtained by suppressing signal components in directions other than the target sound direction, which are noises, from the main signal power spectrum Px (ω), using the third reference signal power spectrum Pr3 (ω), and is output to the noise suppression coefficient calculation unit 108. The directional pattern of the estimated target sound power spectrum Ps (ω) corresponds to that of the output (y (t)) of the directional microphone device 1.

As indicated in (Eq. 8), the noise suppression coefficient calculation unit 108 divides the estimated target sound power spectrum Ps (ω) to be output, by the main signal power spectrum Px (ω), which is an input signal before the directivity of which is narrowed, to calculate transfer characteristic H (ω). The noise suppression coefficient calculation unit 108 outputs the calculated transfer characteristic H (ω) to the noise suppression processing unit 109.

$$H(\omega)=Ps(\omega)/Px(\omega) \quad \text{(Eq. 8)}$$

(Eq. 8) is an example of a calculation method using Wiener filter transfer characteristics typically used for power-spectrum based noise suppression (noise suppressor).

The noise suppression processing unit 109 calculates a product of the noise suppression coefficient H (ω) and the main signal spectrum X (ω) and performs frequency-to-time conversion as indicated in (Eq. 9) to generate time waveform output y (t). It should be noted that (Eq. 9) represents the frequency-to-time conversion process in IFFT {•} (inverse FFT operation) as an example.

$$y(t)=\text{IFFT}\,\{H(\omega)\cdot X(\omega)\} \quad \text{(Eq. 9)}$$

Performing the operations as indicated in (Eq. 8) and (Eq. 9) narrows the directional pattern indicated by the solid line in FIG. 5A of the main signal x (t) to the directional pattern indicated by the solid line in FIG. 5B and the main signal x (t) is output as the signal y (t).

Performing the processing as described above suppresses the signal components in the directions other than the target sound direction and narrows the directivity of the directional microphone.

The directional microphone device 1 has characteristics of focusing on the directional pattern of the reference signal and that the correction unit 105 and the second power spectrum calculation unit 1062 perform the correction process which approximates the directional pattern of the reference signal to an ideal directional pattern. Then, the correction unit 105 performs the correction process of multiplying the first reference signal spectrum R1 (ω) by the main signal spectrum N times.

It should be noted that N=0 described above corresponds to a case where no correction is made to the directional pattern of the reference signal, and thus is equivalent to the conventional method. Hereinafter, conventional problems will be described, with reference to FIG. 5A. Here, it is assumed that the target sound is from in the frontal direction, the noise A is from in the 90 degree direction, and a noise B is from in the 120 degree direction. To adequately suppress the noise A from the 90 degree direction, it is necessary that the sensitivity in the 90 degree direction of the main signal and the reference signal coincide with each other, which will be referred to, herein, as level adjustment. FIG. 5A shows a state where the level adjustment is conducted with respect to the noise A from the 90 degree direction by the coefficient C (ω), where values of the solid line (Px (ω)) and the dashed lines (Pr3 (ω)) of the directional patterns coincide in the 90 degree direction.

At this time, in the noise B from the 120 degree direction, the sensitivity of the reference signal is higher than the sensitivity of the main signal and thus the noise B from the 120 degree direction is excessively suppressed. Due to this, a learning mechanism to conduct proper level adjustment on the reference signal according to the intensity of the noise A or the noise B is needed.

Ideally, preferably, the directional pattern of the reference signal has a blind spot in sensitivity in the frontal direction, and portions of the directional pattern in the directions other than the frontal direction coincide with the directional pattern of the main signal. Coincidence of the directional patterns of the main signal and the reference signal in directions other than the frontal direction obviates the need for the value (the coefficient C (ω)) for level adjusting the reference signal with respect to the noise A from the 90 degree direction and the noise B from the 120 degree direction, for example. In other words, increased coincidence of the directional patterns of the main signal and the reference signal in the directions other than the frontal direction allows adequate noise suppression simultaneously in all directions. Thus, as the directional pattern of the reference signal approximates to an ideal shape, accuracy in the noise suppression increases, thereby allowing the directivity of the directional microphone device to be narrowed and an improved sound quality to be obtained. Moreover, the coefficient C (ω) does not have to be adjusted, as required, adaptively to a spatial distribution of a noise source. Thus, compared with the conventional, the processing can also be simplified, using the coefficient as a fixed constant.

Thus, to increase the coincidence of the directional pattern of the reference signal with the directional pattern of the main signal in the directions other than the frontal direction of the reference signal, the correction unit 105 and the second power spectrum calculation unit multiply the first reference signal spectrum R1 (ω) by the main signal spectrum X (ω) N times (N>0) as indicated in (Eq. 3) and (Eq. 4) to obtain the reference signal power spectrum.

Here, the first reference signal spectrum R1 (ω) has zero sensitivity in an angular direction of the blind spot in sensitivity. Thus, no matter how many times the first reference signal spectrum R1 (ω) is multiplied by the main signal spectrum X (ω), the sensitivity of the first reference signal spectrum R1 (ω) remains zero in the angular direction of the blind spot in sensitivity. On the other hand, the sensitivity in directions other than the angular direction of the blind spot in sensitivity has certain values, despite the differences in degree of the sensitivity. Thus, as the number of times N that the main signal spectrum X (ω) is multiplied increases an affect of the main signal spectrum X (ω) increases as the increase in N, thereby the directional pattern of the reference signal approximating to the directional pattern of the main signal. In theory, when N=∞, for example, the angular ranges in the directions other than the target sound direction, which is the blind spot in sensitivity (the sensitivity=zero) of the first reference signal spectrum R1 (ω), have the same directional pattern as the main signal spectrum X (ω).

Figure 6A:
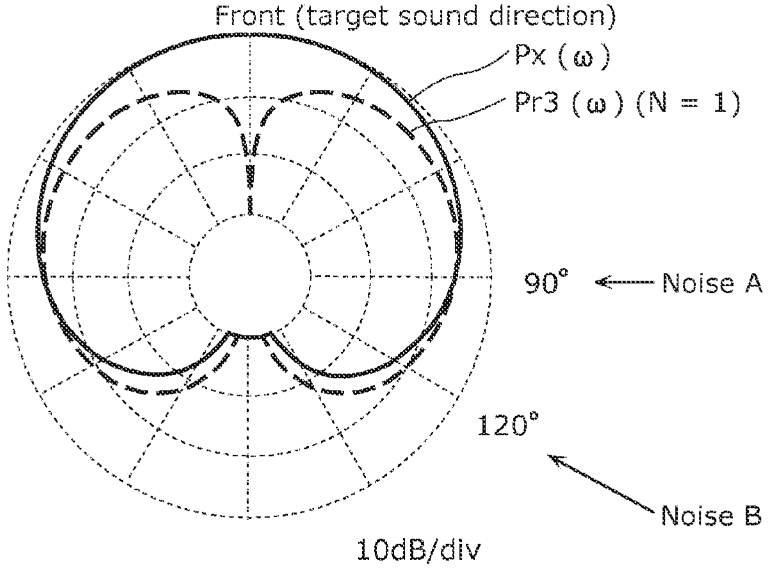
FIG. 6A is a graph illustrating the relationship between the directional patterns of the main signal power spectrum Px (ω) and the third reference signal power spectrum Pr3 (ω) when N=1 in the embodiment 1.
Figure 7A:
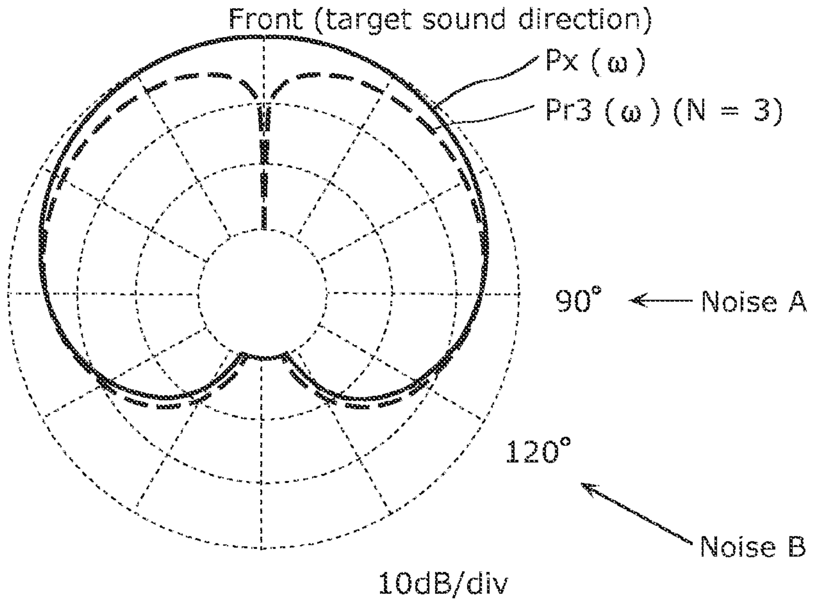
FIG. 7A is a graph illustrating the relationship between the directional patterns of the main signal power spectrum Px (ω) and the third reference signal power spectrum Pr3 (ω) when N=3 in the embodiment 1.

FIG. 6A is a graph illustrating the relationship between the directional patterns of the main signal power spectrum Px (ω) and the third reference signal power spectrum Pr3 (ω) when N=1 in the embodiment 1. FIG. 7A is a graph illustrating the relationship between the directional patterns of the main signal power spectrum Px (ω) and the third reference signal power spectrum Pr3 (ω) when N=3 in the embodiment 1. FIG.

8A is a graph illustrating the relationship between the directional patterns of the main signal power spectrum Px (ω) and the third reference signal power spectrum Pr3 (ω) when N=7 in the embodiment 1.

Figure 8A:
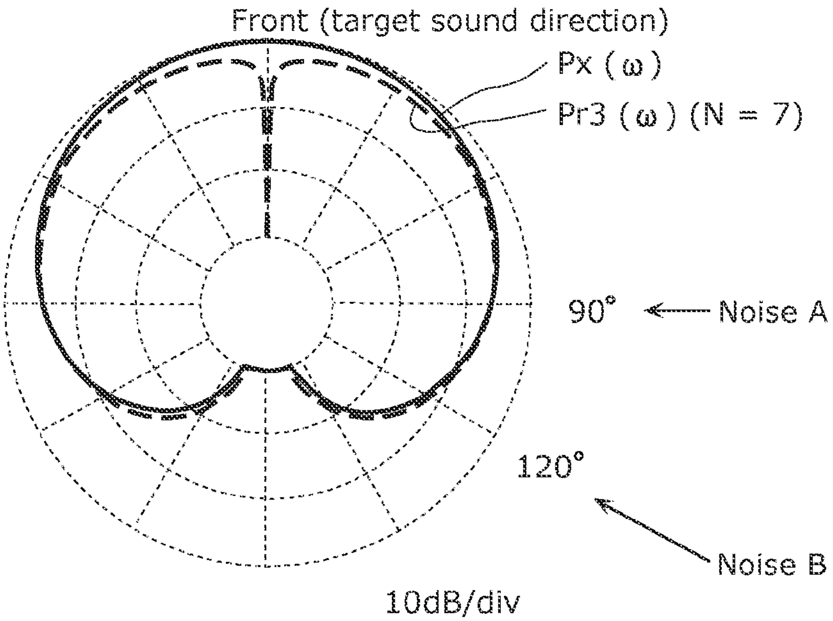
FIG. 8A is a graph illustrating the relationship between the directional patterns of the main signal power spectrum Px (ω) and the third reference signal power spectrum Pr3 (ω) when N=7 in the embodiment 1.

Specifically, the dashed lines in FIGS. 6A, 7A, and 8A indicate the respective directional patterns of the third reference signal Pr3 (ω) that are calculated by (Eq. 3), (Eq. 4), and (Eq. 5) where the number of times N of the multiplication is increased as N=1, N=3, and N=7. Comparing the main signal power spectrum Px (ω) (the solid line) and the reference signal power spectrum Pr3 (ω) (the dashed lines) shown in FIG. 8A, for example, as can be seen that the coincidence of the directional patterns between the main signal power spectrum Px (ω) and the reference signal power spectrum Pr3 (ω) is high in directions other than the target sound direction, the coincidence of the reference signal power spectrum Pr3 (ω) with the directional pattern of the main signal power spectrum Px (ω) increases with an increase in N from N=1 to N=7.

Figure 6B:
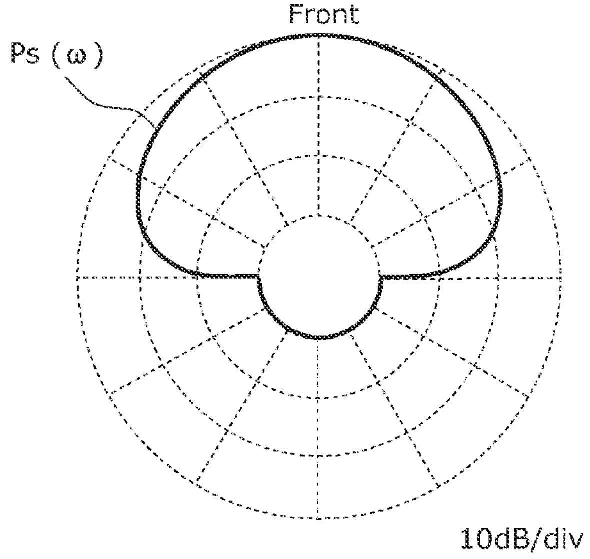
FIG. 6B is a graph illustrating the directional pattern of the estimated target sound power spectrum Ps (ω) when N=1 in the embodiment 1.
Figure 7B:
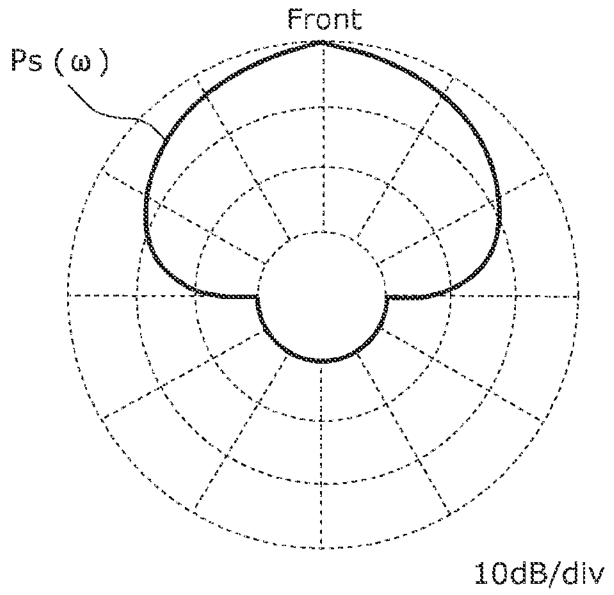
FIG. 7B is a graph illustrating the directional pattern of the estimated target sound power spectrum Ps (ω) when N=3 in the embodiment 1.
Figure 8B:
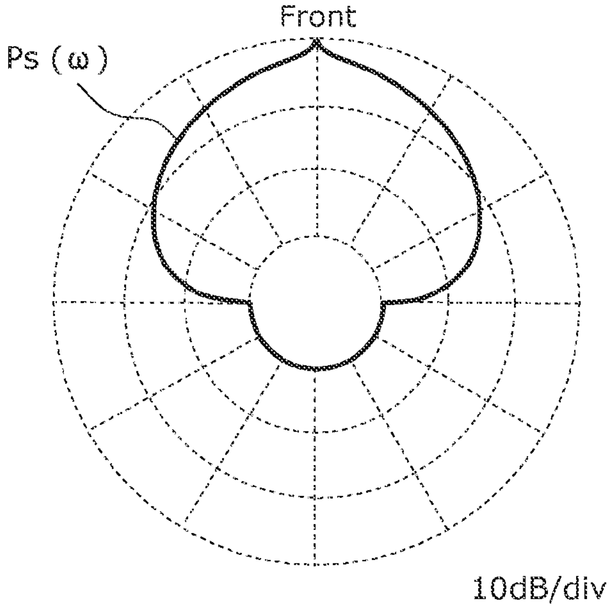
FIG. 8B is a graph illustrating the directional pattern of the estimated target sound power spectrum Ps (ω) when N=7 in the embodiment 1.

FIG. 6B is a graph illustrating the directional pattern of the estimated target sound power spectrum Ps (ω) when N=1 in the embodiment 1. FIG. 7B is a graph illustrating the directional pattern of the estimated target sound power spectrum Ps (ω) when N=3 in the embodiment 1. FIG. 8B is a graph illustrating the directional pattern of the estimated target sound power spectrum Ps (ω) when N=7 in the embodiment 1.

Specifically, as shown in FIGS. 6B, 7B, and 8B, it can be seen that the directional pattern of the estimated target sound power spectrum Ps (ω) obtained by subtracting the third reference signal power spectrum Pr3 (ω) from the main signal power spectrum Px (ω) can also be narrowed with an increase in N. Here, the directional pattern of the estimated target sound power spectrum Ps (ω) is target output of the noise suppression unit, and thus is equal to the directional pattern of the output y (t) of the directional microphone device.

As such, according to the configuration of the embodiment 1, the directional microphone device that can form the directivity having a narrow directional angle in the target direction can be implemented. More specifically, according to the directional microphone device 1 of the embodiment 1, the coincidence of the directional pattern of the reference signal in the directions other than the target sound direction with the directional pattern of the main signal can be increased and accuracy in noise estimation by the noise suppression processing unit improves, thereby allowing the directivity to be narrowed and an improved sound quality to be obtained.

Figure 9:
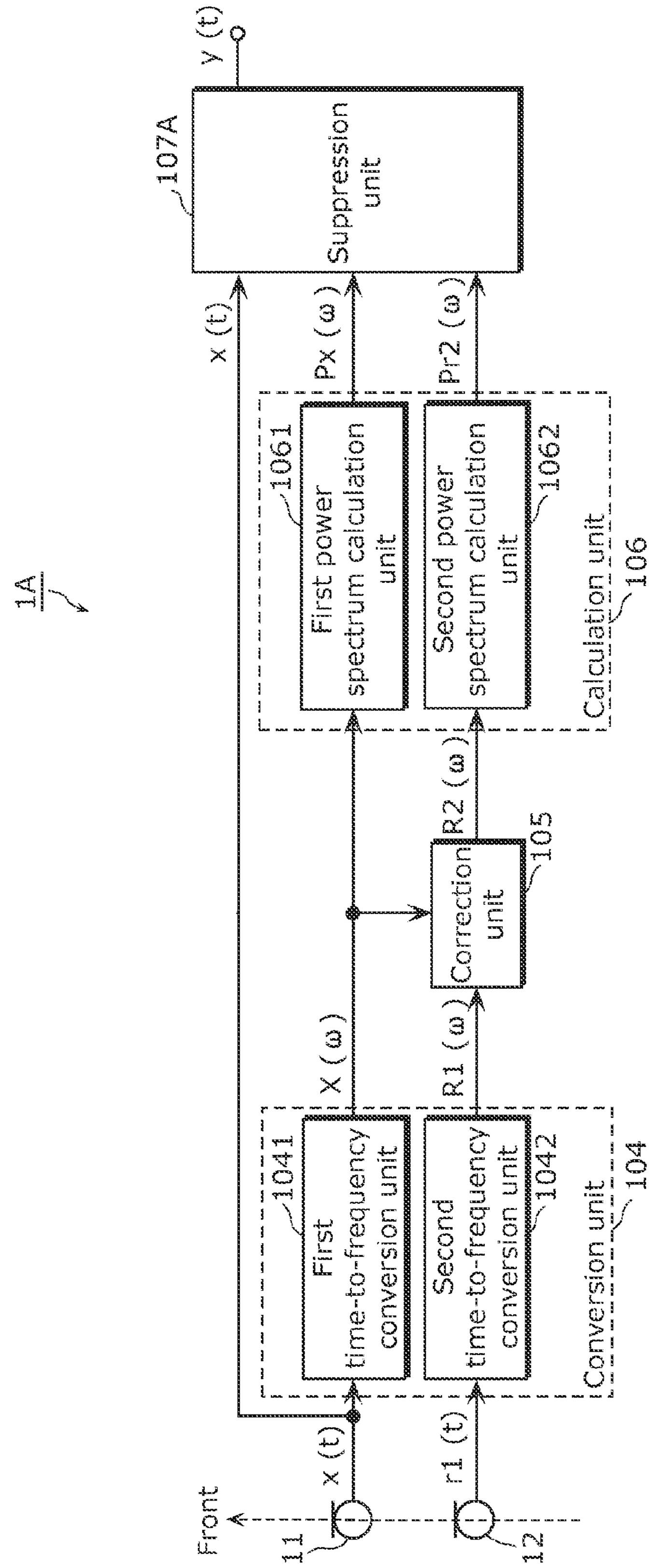
FIG. 9 is a diagram showing a configuration of a directional microphone device according to a variation of the embodiment 1.

It should be noted that, as shown in FIG. 9, the output signal x (t) from the first microphone 11 may be input to the suppression unit 107, instead of the main signal spectrum X (ω). The specific example will be described below as a variation.

(Variation)

Figure 10:
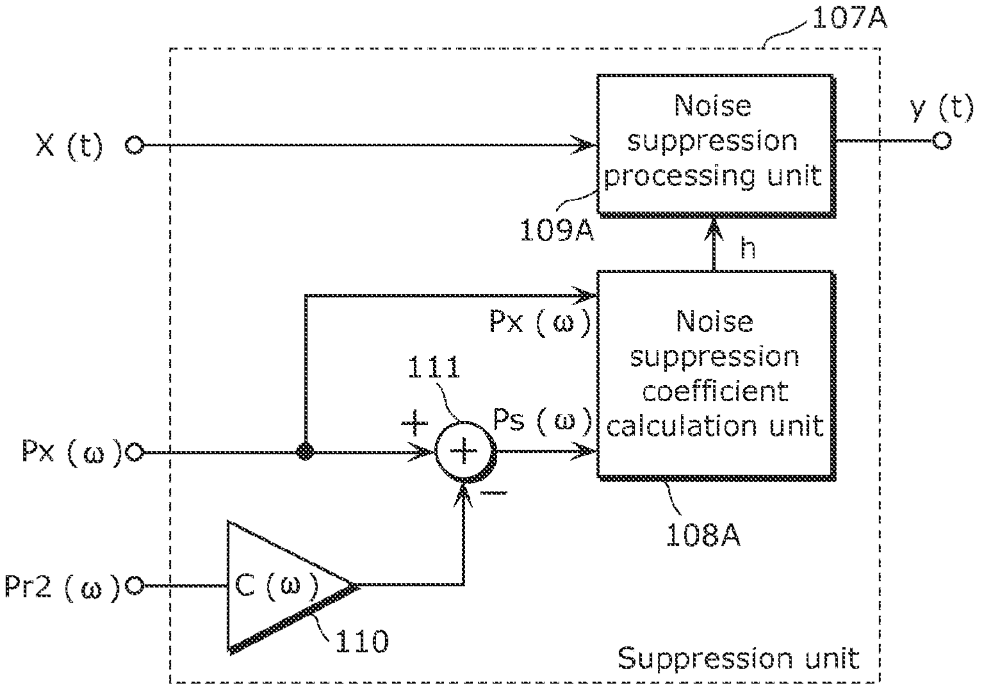
FIG. 10 is a diagram showing an example of a configuration of a suppression unit according to the variation of the embodiment 1.

FIG. 9 is a diagram showing a configuration of a directional microphone device according to a variation of the embodiment 1. FIG. 10 is a diagram showing an example of a configuration of a suppression unit according to the variation of the embodiment 1. It should be noted that the same reference signs will be used herein to refer to the same components as those shown in FIGS. 1 and 3, and detailed description will be omitted.

A directional microphone device 1A shown in FIG. 9 is different from the directional microphone device 1 according to the embodiment 1 in configuration that a suppression unit 107A is provided.

The suppression unit 107A performs noise suppression using the first acoustic signal generated by the first microphone 11 as the main signal and the third acoustic signal generated by the correction unit 105 as the reference signal to generate the output acoustic signal which includes the first acoustic signal that has narrowed directivity in the target direction. More specifically, the suppression unit 107A performs the noise suppression using the first acoustic signal (x (t)) generated by the first microphone 11 and the power spectrum (Px (ω)) of the first acoustic signal calculated by the calculation unit 106 as main signals and the power spectrum of (Pr2 (ω)) of the third acoustic signal calculated by the calculation unit 106 as the reference signal to generate the output acoustic signal.

More specifically, the suppression unit 107A, as shown in FIG. 10, includes the first coefficient multiplication unit 110, the first subtractor unit 111, a noise suppression coefficient calculation unit 108A, and a noise suppression processing unit 109A. The suppression unit 107A shown in FIG. 10 is different from the suppression unit 107 according to the embodiment 1 in configuration that the noise suppression coefficient calculation unit 108A and the noise suppression processing unit 109A are provided.

The noise suppression processing unit 109A performs noise suppression on the first acoustic signal, using, as input, a noise suppression coefficient calculated by the noise suppression coefficient calculation unit 108A and the first acoustic signal, to generate the output acoustic signal y (t).

As shown in FIG. 10, the input and output of the noise suppression processing unit 109A are a time-domain signal X (t) and time-domain signal y (t), respectively. The output of the noise suppression coefficient calculation unit 108A is a filter coefficient h for use in the noise suppression processing unit 109A, which can be calculated by the following equation, for example.

$$h(n)=\mathrm{IFFT}\{Ps(\omega)/Px(\omega)\} \quad \text{(Eq. 10)}$$

Then, the noise suppression processing unit 109 may perform filtering indicated in (Eq. 11).

$$y(t)=\Sigma x(t-n)\cdot h(n) \quad \text{(Eq. 11)}$$

As described above, according to the configuration of the variation of the embodiment 1, the directional microphone device that can form the directivity having a narrow directional angle in the target direction can be implemented.

It should be noted that N in (Eq. 3) and (Eq. 4) may not be an integer, but a real number greater than zero if minute adjustment for narrowing the directional angle of the directivity in the target direction is needed.

Moreover, the first microphone 11 and the second microphone 12 may each be a signal of a microphone element or a signal obtained by processing a signal from a microphone array of a plurality of microphone elements.

(Embodiment 2)

The embodiment 1 has been described in which the number of times N that the correction unit 105 multiplies the first reference signal spectrum R1 (ω) by the main signal spectrum X (ω) is a predetermined value. However, N is not limited thereto. N may be varied. An example of this case will be described below.

Figure 11:
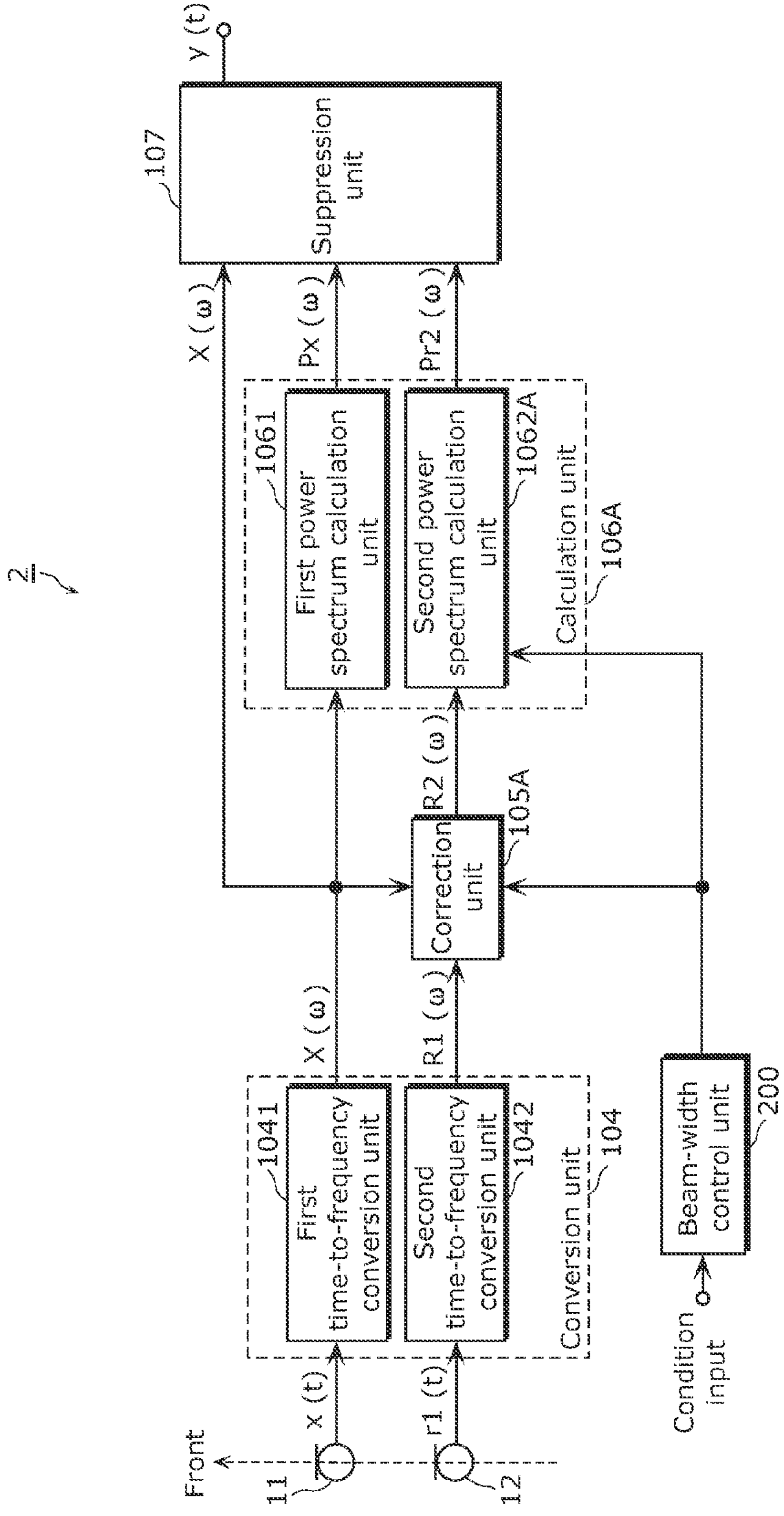
FIG. 11 is a diagram showing an example of a configuration of a directional microphone device according to an embodiment 2.

FIG. 11 is a diagram showing an example of a configuration of a directional microphone device according to an embodiment 2. It should be noted that the same reference signs will be used to refer to the same components as those of the directional microphone device of FIG. 1 and the description will be omitted.

A directional microphone device 2 shown in FIG. 11 is different from the directional microphone device 1 in FIG. 1 in configuration that a correction unit 105A and a calculation unit 106A are provided and a beam-width control unit 200 is added.

The correction unit 105A has the functionality of the correction unit 105, and, additionally, is controlled by the beam-width control unit 200 with respect to the value of N which is the number of times of the multiplication indicated in (Eq. 3).

A second power spectrum calculation unit 1062A has the functionality of the second power spectrum calculation unit 1062 and, additionally, is controlled by the beam-width control unit 200 with respect to the value of N indicated in (Eq. 4).

The beam-width control unit 200 changes the value of N, which is the number of times of the multiplication by the correction unit 105A, and the value of N in the power of (2/(N+1)) used by the calculation unit 106 (the second power spectrum calculation unit 1062A) to control the directivity of the directional microphone device 2.

Here, the beam-width control unit 200 allows a user to input a setting value of N or allows input of a zoom control signal in conjunction with image zooming in a camera system to control the value of N.

Operation of the directional microphone device 2 configured as set forth above will be described.

Setting the number of times N of the multiplication of the main signal spectrum in (Eq. 3) and (Eq. 4) in the embodiment 1 to a variable allows controlling of the directional pattern of an estimated target sound power spectrum Ps (ω) in a range from the case where N=0 as indicated in FIG. 5B to the case where N=7 as indicated in FIG. 8B. For example, the directional pattern of the output y (t) of the directional microphone device 2 can be narrowed by the beam-width control unit 200 incrementing the value of N. In other words, a wide angle of directivity of the directional microphone device 2 can be changed to a narrow angle by the beam-width control unit 200 controlling the value of N.

As such, according to the configuration of the embodiment 2, the directional microphone device that can form the directivity having a narrow directional angle in the target direction can be implemented. Additionally, according to the configuration of the embodiment 2, the user is allowed to set the directional pattern of the directional microphone device 2 or obtain zoom sound effect in conjunction with image zooming, for example.

(Embodiment 3)

In the following embodiment, the same reference signs are given to the components that have the same functionality, and the description already set forth is omitted. In the following, the 0 degree direction in the figure indicates a target direction.

Figure 12:
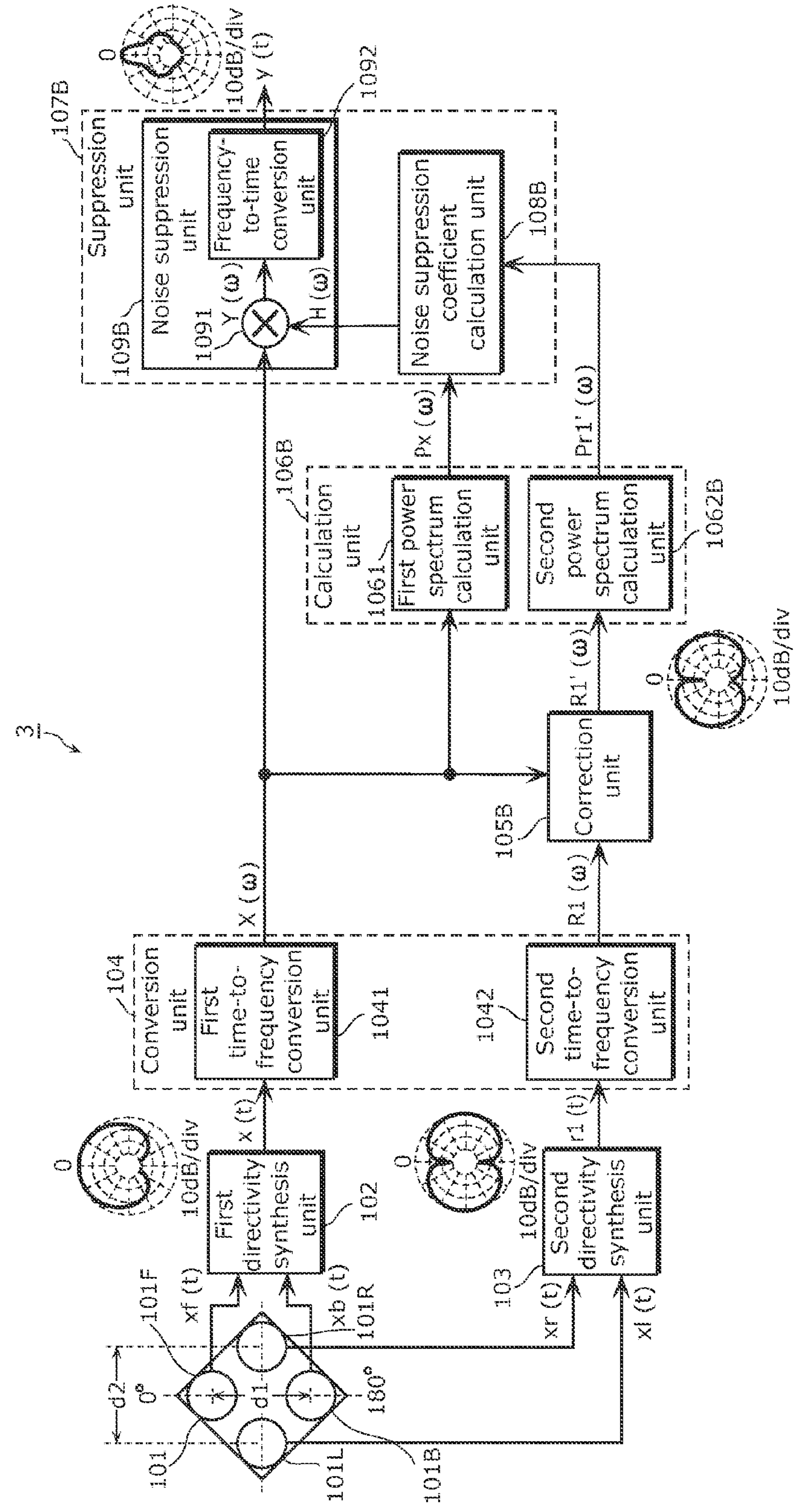
FIG. 12 is a diagram showing an example of a configuration of a directional microphone device according to an embodiment 3.
Figure 13:
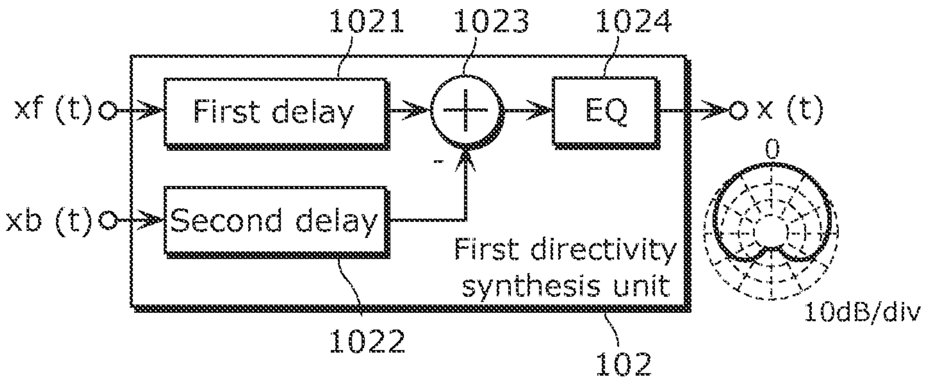
FIG. 13 is a diagram showing an example of a configuration of a first directivity synthesis unit according to the embodiment 3.
Figure 14:
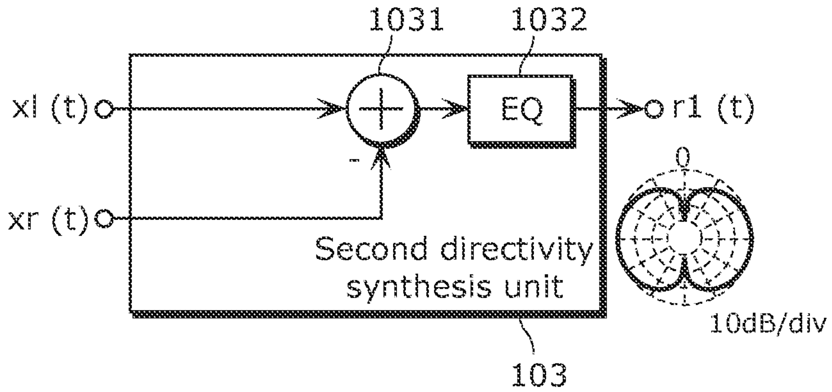
FIG. 14 is a diagram showing an example of a configuration of a second directivity synthesis unit according to the embodiment 3.

FIG. 12 is a diagram showing an example of a configuration of a directional microphone device according to the embodiment 3. FIG. 13 is a diagram showing an example of a configuration of a first directivity synthesis unit according to the embodiment 3. FIG. 14 is a diagram showing an example of a configuration of a second directivity synthesis unit according to the embodiment 3.

A directional microphone device 3 shown in FIG. 12 includes a microphone array 101, a first directivity synthesis unit 102, a second directivity synthesis unit 103, a conversion unit 104, a correction unit 105B, a calculation unit 106B, and a suppression unit 107B.

The microphone array 101 includes a plurality of microphones. Specifically, the microphone array 101 includes a plurality of omnidirectional microphone units, and is disposed in a relatively small space. The microphone array 101 is integrated into a device, such as a video camera and a digital still camera.

In the present embodiment, the microphone array 101 includes four omnidirectional microphone units 101F, 101B, 101L, and 101R forming a rhomboid shape in the target direction, for example, as shown in FIG. 12. The omnidirectional microphone units 101F, 101B, 101L, and 101R output acoustic signals xf (t), xb (t), xl (t), and xr (t), respectively. Here, a distance d1 is a distance between the omnidirectional microphone units 101F and 101B, and a distance d2 is a distance between the omnidirectional microphone units 101L and 101R. The distances d1 and d2 are any values determined according to required frequency bands or setup space restrictions. In the following, description will be given by way of example, where d1 and d2 =about 5 mm to about 100 mm range from a viewpoint of frequency band.

The first directivity synthesis unit 102 processes the output signal of the microphone array 101 to generate a first acoustic signal which has the sensitivity in the target direction. In the present embodiment, the first directivity synthesis unit 102 generates an acoustic signal x (t) (referred to also as a directional signal x (t)) that has the directivity having the principal axis in the target direction, using the acoustic signals xf (t) and xb (t) respectively from the omnidirectional microphone units 101F and 1018. Here, the acoustic signal x (t) is a specific example of the first acoustic signal.

The first directivity synthesis unit 102, as shown in FIG. 13, includes a first delay 1021, a second delay 1022, a subtractor 1023, and an EQ (equalizer) 1024. The first directivity synthesis unit 102 forms pressure-gradient unidirectivity that has the principal axis in the target direction (zero degree).

The first delay 1021 is configured with a digital filter and the acoustic signal xf (t) is input thereto. Similarly, the second delay 1022 is configured with a digital filter and the acoustic signal xb (t) is input thereto.

Filter coefficients of the respective digital filters which the first delay 1021 and the second delay 1022 are configured with are designed as follows. Specifically, the filter coefficients are designed so that the acoustic signals xf (t) and xb (t) corresponding to an acoustic wave arriving from the 180 degree direction in FIG. 12 are input in equal phase to the subtractor 1023. More specifically, the filter coefficients are designed so that the second delay 1022 delays for d1/c [s] relative to the first delay 1021, where c is acoustic velocity [m/s].

The subtractor 1023 subtracts the output signal of the second delay 1022 from the output signal of the first delay 1021. This allows elimination of the sensitivity in the 180 degree direction (producing a blind spot in sensitivity in the target direction), thereby allowing a signal that has relatively high sensitivity in the zero-degree direction (the target direction) to be obtained. The output signal of the subtractor 1023 has amplitude-frequency characteristic of having a gradient of −6 dB/Octave as the frequency theoretically decreases (the wavelength increases) in the zero-degree direction.

The EQ 1024 performs correction so that the amplitude-frequency characteristic of the output signal of the subtractor 1023 is flat, to generate and output the acoustic signal x (t).

The first directivity synthesis unit 102 is configured as described above.

The second directivity synthesis unit 103 processes the output signal of the microphone array 101 to generate a second acoustic signal that has a blind spot in sensitivity in the target direction. In the present embodiment, the second directivity synthesis unit 103 generates an acoustic signal r1 (t) (hereinafter, referred to also as a directional signal r1 (t)) that has the directivity having a blind spot in sensitivity in the target direction, using the acoustic signals xl (t) and xr (t) respectively from the omnidirectional microphone units 101L and 101R. Here, the acoustic signal r1 (t) is a specific example of the second acoustic signal.

The second directivity synthesis unit 103, as shown in FIG. 14, includes a subtractor 1031 and an EQ 1032. The second directivity synthesis unit 103 forms bidirectivity that has a blind spot in sensitivity each in the target direction (zero degree) and an opposite direction (180 degree) from the target direction.

The subtractor 1031 subtracts the acoustic signal xr (t) from the acoustic signal xl (t). It should be noted that acoustic waves from the zero-degree direction (the target direction) and the 180 degree direction are, in an ideal state, input in equal phase and amplitude to the omnidirectional microphone units 101L and 101R, respectively. Thus, the output signal from the subtractor 1031 is zero.

The output signal of the subtractor 1031 has amplitude-frequency characteristic of having a gradient of −6 dB/Octave as the frequency theoretically decreases (the wavelength increases) in the 90 degree direction or the 270 degree direction.

The EQ 1032 performs correction so that the amplitude-frequency characteristic of the output signal of the subtractor 1031 is flat, to generate and output the acoustic signal r1 (t).

The second directivity synthesis unit 103 is configured as described above.

The conversion unit 104 is by way of example of a first conversion unit. The conversion unit 104 converts the first acoustic signal generated by the first directivity synthesis unit 102 and the second acoustic signal generated by the second directivity synthesis unit 103 into frequency-domain signals. In the present embodiment, as shown in FIG. 12, the conversion unit 104 includes a first time-to-frequency conversion unit 1041 and a second time-to-frequency conversion unit 1042.

The first time-to-frequency conversion unit 1041 performs a fast Fourier transform, filter bank, wavelet transform, or the like on the acoustic signal x (t) from the first directivity synthesis unit 102 frame by frame each including a plurality of samples accumulated (e.g., the number of samples per frame is the power of 2, such as 256), to calculate a frequency-domain signal X (ω). It should be noted that the first time-to-frequency conversion unit 1041 may accumulate the acoustic signal x (t) for 50% overlap or apply a window, such as a Hamming window, to the accumulated acoustic signals x (t) to calculate the signal X (ω).

The second time-to-frequency conversion unit 1042 performs the fast Fourier transform, filter bank, wavelet transform, or the like on the acoustic signal r1 (t) from the second directivity synthesis unit 103 in the same manner as in the first time-to-frequency conversion unit 1041 described above, to calculate a frequency-domain signal R1 (ω).

The correction unit 105B is by way of example of a correction unit. The correction unit 105B multiplies, in the frequency domain, the second acoustic signal generated by the second directivity synthesis unit 103 by the first acoustic signal generated by the first directivity synthesis unit 102 N times (N>0), to generate a third acoustic signal that has a narrower angular range of the blind spot in sensitivity in the target direction than the second acoustic signal. More specifically, the correction unit 105B multiplies the first acoustic signal converted by the conversion unit 104 into the frequency-domain signal by the second acoustic signal converted by the conversion unit 104 into the frequency-domain signal N times (N>0), to generate the third acoustic signal. While in the embodiments 1 and 2, the second power spectrum calculation unit 1062 converts the signal spectrum that has been multiplied by itself N+1 times into order of power (square), it should be noted that in the following, using an output signal output from the correction unit 105B as input, a second power spectrum calculation unit 1062B calculates a power spectrum of the output signal. Description will be given assuming that the correction unit 105B converts a signal spectrum that has been multiplied by itself N+1 times into an amplitude spectrum and outputs the amplitude spectrum. The present embodiment and the subsequent embodiments will be described, assuming N=1.

In the present embodiment, the correction unit 105B spectrum multiplies the signal X (ω) which is the output signal of the first time-to-frequency conversion unit 1041 and the signal R1 (ω) which is the output signal of the second time-to-frequency conversion unit 1042, to calculate a signal R1' (ω) which includes the signal R1 (ω) that has a narrowed angular range of the blind spot in sensitivity in the target direction. It should be noted that the signal R1' (ω) is a specific example of the third acoustic signal.

More specific description will be given below.

Figure 15A:
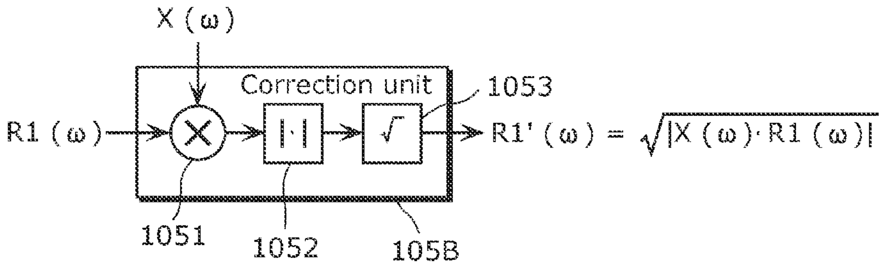
FIG. 15A is a diagram showing an example of a functional configuration of a correction unit according to the embodiment 3.
Figure 15B:
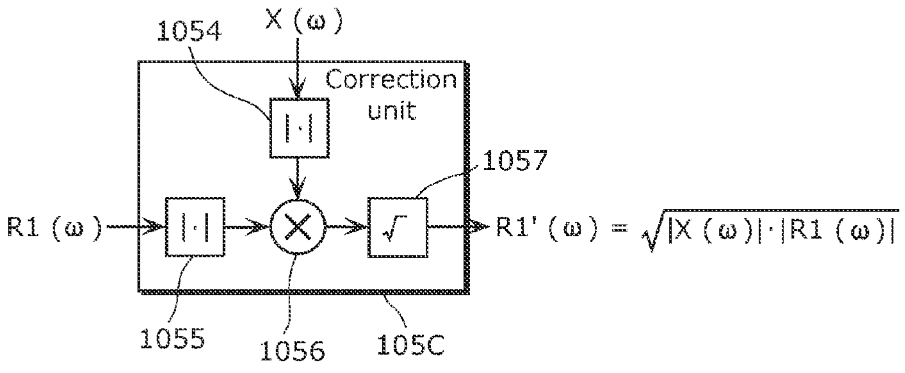
FIG. 15B is a diagram showing an example of a functional configuration of the correction unit according to the embodiment 3.

FIGS. 15A and 15B are diagrams each showing an example of a functional configuration of the correction unit according to the embodiment 3.

For example, as shown in FIG. 15A, the correction unit 105B includes a spectral multiplication unit 1051, an absolute value operation unit 1052, and a square root calculation unit 1053. The correction unit 105B performs the equation indicated in (Eq. 12).

[Math. 1]

$$R1'(\omega)=\sqrt{|X(\omega)\cdot R1(\omega)|} \quad \text{(Eq. 12)}$$

In this case, the spectral multiplication unit 1051 complex multiplies the second acoustic signal converted into the frequency-domain signal and the first acoustic signal converted into the frequency-domain signal. In the present embodiment, the spectral multiplication unit 1051 spectrum multiplies the signal X (ω) and the signal R1 (ω) as shown in FIG. 15A.

The absolute value operation unit 1052 calculates an absolute value of an output signal of the spectral multiplication unit 1051. In the present embodiment, the absolute value operation unit 1052 calculates an absolute value of a multiplication value obtained by multiplying the signal X (ω) and the signal R1 (ω).

The square root calculation unit 1053 calculates the square root of the absolute value calculated by the absolute value operation unit 1052 to generate the third acoustic signal. In the present embodiment, the square root calculation unit 1053 calculates the signal R1' (ω).

It should be noted that the correction unit 105B is not limited to have the functional configuration shown in FIG. 15A. For example, as shown in FIG. 15B, the correction unit 105B may be a correction unit 105C which includes absolute value operation units 1054 and 1055, a multiplier unit 1056, and a square root calculation unit 1057, and perform the equation indicated in (Eq. 13). This is because the same result as performing the equation indicated in (Eq. 12) is obtained from performing the equation indicated in (Eq. 13).

[Math. 2]

$$R1'(\omega)=\sqrt{|X(\omega)|\cdot|R1(\omega)|} \quad \text{(Eq. 13)}$$

In this case, the absolute value operation units 1054 and 1055, respectively, calculate a first absolute value of the first acoustic signal converted into the frequency-domain signal, and a second absolute value of the second acoustic signal converted into the frequency-domain signal. In the present embodiment, as shown in FIG. 15B, the absolute value operation unit 1054 calculates an absolute value (the first absolute value) of the signal X (ω), and the absolute value operation unit 1055 calculates an absolute value (the second absolute value) of the signal R1 (ω).

The multiplier unit 1056 multiplies the first absolute value and the second absolute value respectively calculated by the absolute value operation units 1054 and 1055. In the present embodiment, the multiplier unit 1056 multiplies an absolute value (the first absolute value) of the signal X (ω) and an absolute value (the second absolute value) of the signal R1 (ω).

The square root calculation unit 1057 calculates the square root of the multiplication value obtained by the multiplier unit 1056 to generate the third acoustic signal. In the present embodiment, the square root calculation unit 1057 calculates the signal R1' (ω).

While the description has been given where the correction unit 105B has the functional configuration of performing the equation indicated in (Eq. 12) or (Eq. 13), the present invention is not limited thereto, insofar as the same result is obtained. For example, for the calculation a conjugate complex number of either or both the signal X (ω) and the signal R1 (ω) may be obtained, which yields the same result as performing the equation indicated in (Eq. 12).

Figure 16:
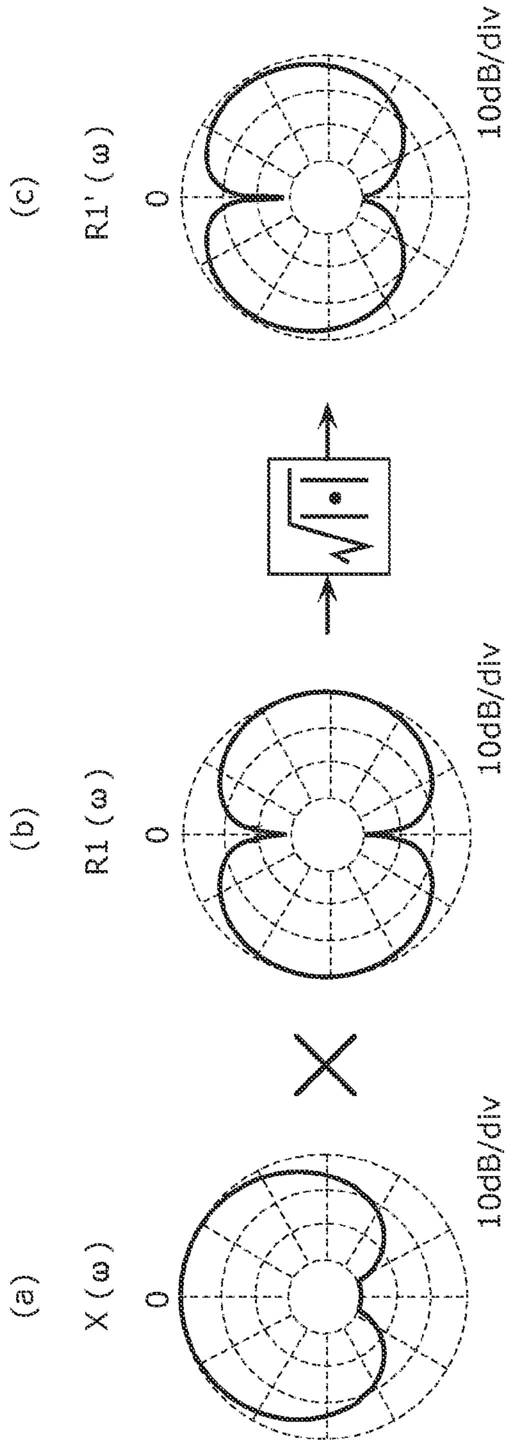
FIG. 16 shows diagrams illustrating directional patterns of input signals and output signal of the correction unit according to the embodiment 3.

FIG. 16 shows diagrams illustrating directional patterns of input signals and an output signal of the correction unit 105B according to the embodiment 3. Part (a) of FIG. 16 illustrates a directional pattern of the signal X (ω), which is the input signal input to the correction unit 105B shown in FIG. 15A. Part (b) of FIG. 16 illustrates the directional pattern of the signal R1 (ω), which is the input signal input to the correction unit 105B shown in FIG. 15A. Part (c) of FIG. 16 illustrates the directional pattern of the signal R1' (ω), which is the output signal output from the correction unit 105B shown in FIG. 15A.

As such, the correction unit 105B performs the calculation process so that the zero sensitivity (the sensitivity in the zero-degree direction in (b) of FIG. 16) formed in the target direction of the signal R1 (ω) that has bidirectivity is also maintained in the target direction of the signal R1' (ω) (the sensitivity in the zero-degree direction in (c) of FIG. 16). The correction unit 105B also performs the calculation process so that the sensitivity (the directivity) of the signal R1' (ω) in the other directions (directions other than the target direction) is the mean of the sensitivity of the signals R1 (ω) and X (ω). In so doing, the correction unit 105B can generate the signal R1' (ω) that has the directivity having a narrower angular range of a blind spot in sensitivity in the target direction than the signal R1 (ω).

The correction unit 105B is configured and performs the calculation process as described above.

The calculation unit 106B is by way of example of a power spectrum calculation unit. The calculation unit 106B calculates power spectra of the first acoustic signal and the second acoustic signal converted into frequency-domain signals. In the present embodiment, as shown in FIG. 12, the calculation unit 106 includes a first power spectrum calculation unit 1061 and a second power spectrum calculation unit 1062B.

The first power spectrum calculation unit 1061 calculates a power spectrum Px (ω) of the signal X (ω) which is the output signal of the first time-to-frequency conversion unit 1041. Here, the first power spectrum calculation unit 1061 calculates the power spectrum Px (ω), using the equation indicated in (Eq. 14), for example.

[Math. 3]

$$Px(\omega)=X^2(\omega) \qquad \text{(Eq. 14)}$$

The second power spectrum calculation unit 1062B calculates a power spectrum Pr1' (ω) of the signal R1' (ω) which is the output signal of the correction unit 1056. Here, the second power spectrum calculation unit 1062B calculates the power spectrum Pr1' (ω), using the equation indicated in (Eq. 15), for example.

[Math. 4]

$$Pr1'(\omega)=R^2(\omega)=|X(\omega)\cdot R1(\omega)|(\omega)|=|X(\omega)|\cdot|R1(\omega)| \qquad \text{(Eq. 15)}$$

The calculation unit 106B is configured and calculates the power spectra as described above.

As can be seen from comparing (Eq. 14) and (Eq. 12) or (Eq. 15) and (Eq. 13), it should be noted that the computation of the square root indicated in (Eq. 12) and (Eq. 13) can be omitted.

The suppression unit 107B performs the noise suppression using the first acoustic signal generated by the first directivity synthesis unit 102 as a main signal and the third acoustic signal generated by the correction unit 105B as a reference signal, to generate an output acoustic signal which includes the first acoustic signal that has narrowed directivity of in the target direction. In the present embodiment, as shown in FIG. 12, the suppression unit 107B includes a noise suppression coefficient calculation unit 108B and a noise suppression unit 109B.

Using the power spectra of the first acoustic signal and the third acoustic signal, the noise suppression coefficient calculation unit 108B calculates a noise suppression coefficient for suppressing noise which is sound that is included in the first acoustic signal and other than sound from the target direction. For example, the noise suppression coefficient calculation unit 108B calculates the noise suppression coefficient, using the power spectrum of the first acoustic signal calculated by the calculation unit 106B as the main signal and the power spectrum of the third acoustic signal calculated by the calculation unit 106B as the reference signal.

In the present embodiment, using the power spectrum Px (ω), which is the output signal of the first power spectrum calculation unit 1061, as the main signal and the power spectrum Pr1' (ω), which is the output signal of the second power spectrum calculation unit 1062B, as the reference signal, the noise suppression coefficient calculation unit 108B calculates a noise suppression coefficient H (ω) for suppressing noise, which is sound from directions other than the target direction, from the power spectrum Px (ω) which is the main signal.

The noise suppression coefficient calculation unit 108B calculates the noise suppression coefficient H (ω), using the equation indicated in (Eq. 16), for example. It should be noted that (Eq. 16) is by way of example of the equation for calculating the noise suppression coefficient H (ω), and is an equation having Wiener filter characteristics.

[Math. 5]

$$H(\omega)=\frac{Px(\omega)-a(\omega)\cdot Pr1'(\omega)}{Px(\omega)} \qquad \text{(Eq. 16)}$$

where α (ω) is a weighting factor.

A method of calculating the weighting factor α (ω) is disclosed in PTL 1, for example. Specifically, first, a spectral ratio Px (ω)/Pr1'(ω) is calculated. Next, a time average of the spectral ratio Px (ω)/Pr1' (ω) is calculated, using (Eq. 18) in the situation where an ambient noise is more dominant than a target sound, that is, for example, the situation as indicated in (Eq. 17) in the case of the configuration according to the present embodiment. The calculated time average corresponds to α (ω).

[Math. 6]

$$\sum_{\omega=f0}^{f1} Px(\omega) < \beta \cdot \sum_{\omega=f0}^{f1} Pr'(\omega) \quad \text{(Eq. 17)}$$

$$\beta < 1.0,\ f0 < f1$$

[Math. 7]

$$a(\omega) - Px(\omega)/Pr1'(\omega) \quad \text{(Eq. 18)}$$

where

[Math. 8]

$$\overline{\qquad\qquad}$$

indicates the time averaging.

It should be noted that since details of the method of calculating the weighting factor α (ω) is disclosed in PTL 1, the description is omitted.

Moreover, the noise suppression coefficient calculation unit 108B only needs to calculate the noise suppression coefficients for suppressing the above noise, using the power spectra of the first acoustic signal and the third acoustic signal. Thus, the noise suppression coefficient calculation unit 108B is not limited to the configuration described above. For example, the configuration disclosed in PTL 3 may be employed. It should be noted that the illustration of the configuration is disclosed in PTL 3, and thus the description herein is omitted.

The noise suppression unit 109B performs the noise suppression of applying the noise suppression coefficient calculated by the noise suppression coefficient calculation unit 108B to the first acoustic signal generated by the first directivity synthesis unit 102 to suppress the noise and extracting only sound from the target direction, to generate the output acoustic signal. In the present embodiment, as shown in FIG. 12, the noise suppression unit 109B includes a multiplier 1091 and a frequency-to-time conversion unit 1092.

The multiplier 1091 multiplies the first acoustic signal converted into the frequency-domain signal and the noise suppression coefficient calculated by the noise suppression coefficient calculation unit 108B to extract only a target acoustic signal that is in the target direction and from which the noise has been suppressed. In the present embodiment, the multiplier 1091 multiplies the signal X (ω), which is the output signal of the first time-to-frequency conversion unit 1041, by the noise suppression coefficient H (ω) calculated by the noise suppression coefficient calculation unit 108B, to calculate a signal Y (ω)=X (ω)·H (ω). The signal Y (ω) is sound from the directions other than the target direction and has noise suppressed from the signal X (ω). Here, the signal Y (ω) is a specific example of the target acoustic signal.

The frequency-to-time conversion unit 1092 is by way of example of an inverse Fourier transform unit. The frequency-to-time conversion unit 1092 converts the target acoustic signal extracted by the multiplier 1091 into a time-domain signal to generate the output acoustic signal. In the present embodiment, the frequency-to-time conversion unit 1092 converts, into a time-domain acoustic signal y (t) by an inverse Fourier transform or the like, the signal Y (ω) which has noise, which is sound from the directions other than the target direction, suppressed and an enhanced sound from the target direction. Here, the acoustic signal y (t) is a specific example of the output acoustic signal.

As described above, according to the present embodiment, the directional microphone device and acoustic signal processing method that can form the directivity having a narrow directional angle in the target direction can be implemented.

More specifically, according to the directional microphone device and an acoustic signal processing method of the present embodiment, using the main signal that has the principal axis in the target direction and the reference signal that has the blind spot in sensitivity in the target direction, these two directional signals (a main signal and a reference signal) that have different blind spots in sensitivity are spectrum multiplied, thereby forming a reference signal that has a narrowed angular range of the blind spot in sensitivity in the target direction. In other words, according to the directional microphone device of the present embodiment, a plurality of microphone units disposed in a relatively small space of the order of a few mm to a few cm are used to suppress sound from the directions other than the target direction and form a reference signal that has a narrow angular range of the blind spot in sensitivity in the target direction, to pick up only sound from the target direction. Then, noise suppression process is performed using the formed reference signal, thereby narrowing the angular range of the blind spot in sensitivity in the target direction of the reference signal.

In other words, according to the directional microphone device and acoustic signal processing method of the present embodiment, the angular range of the blind spot in sensitivity in the target direction of the reference signal can be narrowed and the sound near the target direction can be included in the reference signal. This allows the directivity that has a narrow directional angle to be formed in the target direction, thereby forming an acoustic signal that has the directivity having a narrow directional angle in the target direction.

(Embodiment 4)

Figure 17:
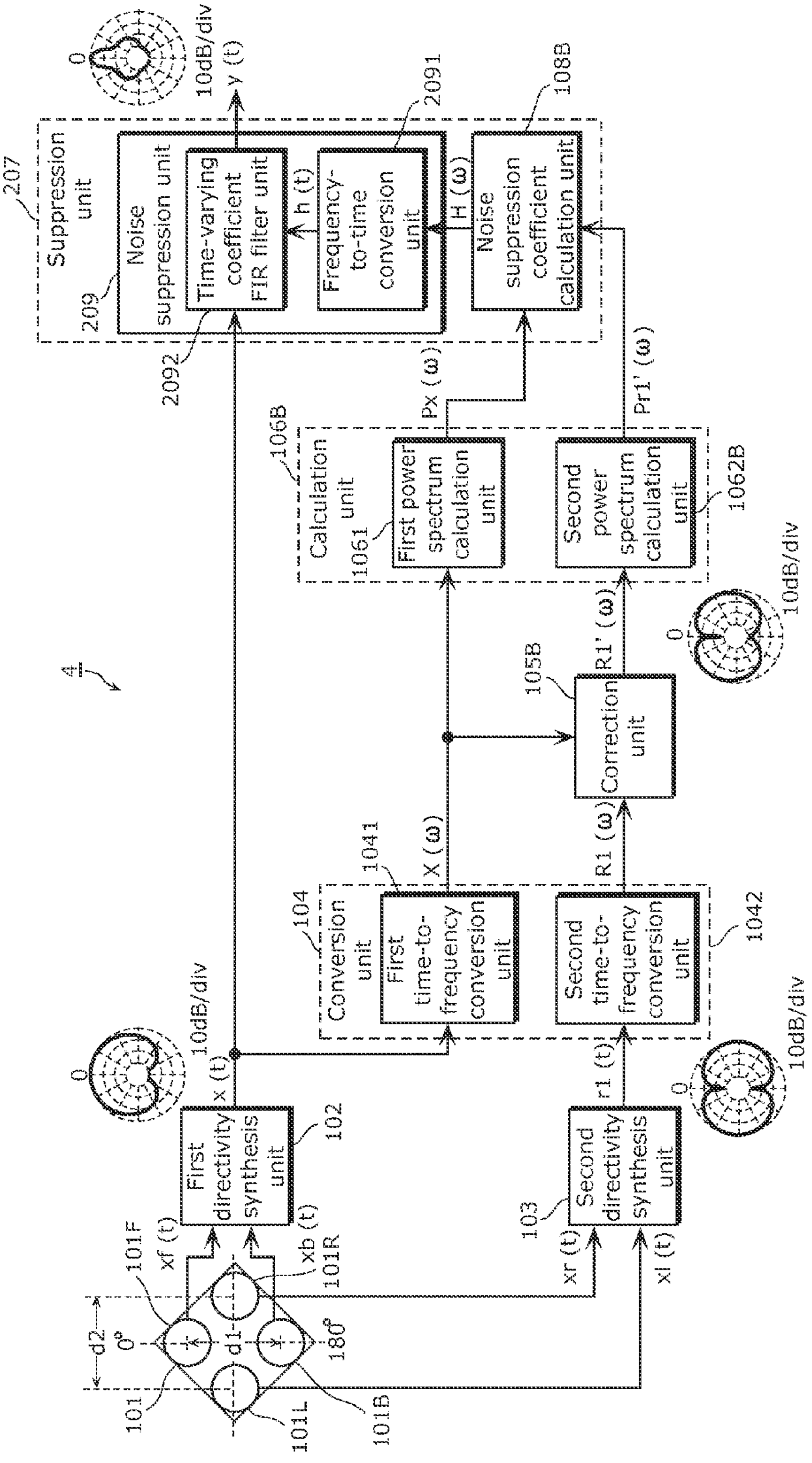
FIG. 17 is a diagram showing an example of a configuration of a directional microphone device according to an embodiment 4.

FIG. 17 is a diagram showing an example of a configuration of a directional microphone device according to an embodiment 4. The same reference signs are used in FIG. 17 to refer to the same components as those shown in FIG. 12 and the description will be omitted.

A directional microphone device 4 shown in FIG. 17 is different from the directional microphone device 3 according to the embodiment 3 in configuration that a noise suppression unit 209 of a suppression unit 207 is provided.

Specifically, the noise suppression unit 209 shown in FIG. 17 is different from the noise suppression unit 109B shown in FIG. 12 in that the noise suppression unit 209 does not include the multiplier 1091 and the frequency-to-time conversion unit 1092, and are added with a frequency-to-time conversion unit 2091 and a time-varying coefficient finite impulse response (FIR) filter unit 2092. Moreover, due to the above modification to the configuration, destinations of output of the first directivity synthesis unit 102 and the first time-to-frequency conversion unit 1041 are changed.

The frequency-to-time conversion unit 2091 is by way of example of a second conversion unit. The frequency-to-time conversion unit 2091 converts a noise suppression coefficient, which is a frequency-domain coefficient, into a time-domain filter coefficient of a FIR filter. In the present embodiment, the frequency-to-time conversion unit 2091 converts a noise suppression coefficient H (ω) calculated by a noise suppression coefficient calculation unit 108B into a time-domain coefficient h (t) of the FIR filter.

The time-varying coefficient FIR filter unit 2092 updates a coefficient of the FIR filter converted by the frequency-to-time conversion unit 2091 one unit time (1 frame) prior, with a coefficient of the FIR filter in the current unit time (the current frame) converted by the frequency-to-time conversion unit 2091 and filters a first acoustic signal generated by a first directivity synthesis unit 102 to generate an output acoustic signal. In the present embodiment, the time-varying coefficient FIR filter unit 2092, first, updates a coefficient hw (t) of the current time-varying coefficient of the FIR filter, according to, for example, (Eq. 19), with the filter coefficient h (t) calculated by the frequency-to-time conversion unit 2091.

[Math. 9]

$$hw(t)=\gamma\cdot h(t)-(1-\gamma)\cdot hw(t-1)\ 0<\gamma\leq 1 \quad \text{(Eq. 19)}$$

where the coefficient γ is a parameter corresponding to a time constant, which allows control of sound quality of the output acoustic signal.

In this manner, the noise suppression unit 209 performs the noise suppression of applying the noise suppression coefficient calculated by the noise suppression coefficient calculation unit 108B to the first acoustic signal generated by the first directivity synthesis unit 102 to suppress noise and extracting only sound from a target direction, to generate the output acoustic signal.

In the present embodiment, the noise suppression unit 209 further includes the frequency-to-time conversion unit 2091 and the time-varying coefficient FIR filter unit 2092, thereby allowing the noise suppression coefficient to be converted into the filter coefficient of the FIR filter and the filter coefficient which is calculated across frames to be updated in a short time scale. Thus, convolution can be used to allow fine control of the sound quality of the output acoustic signal.

(Embodiment 5)

Figure 18:
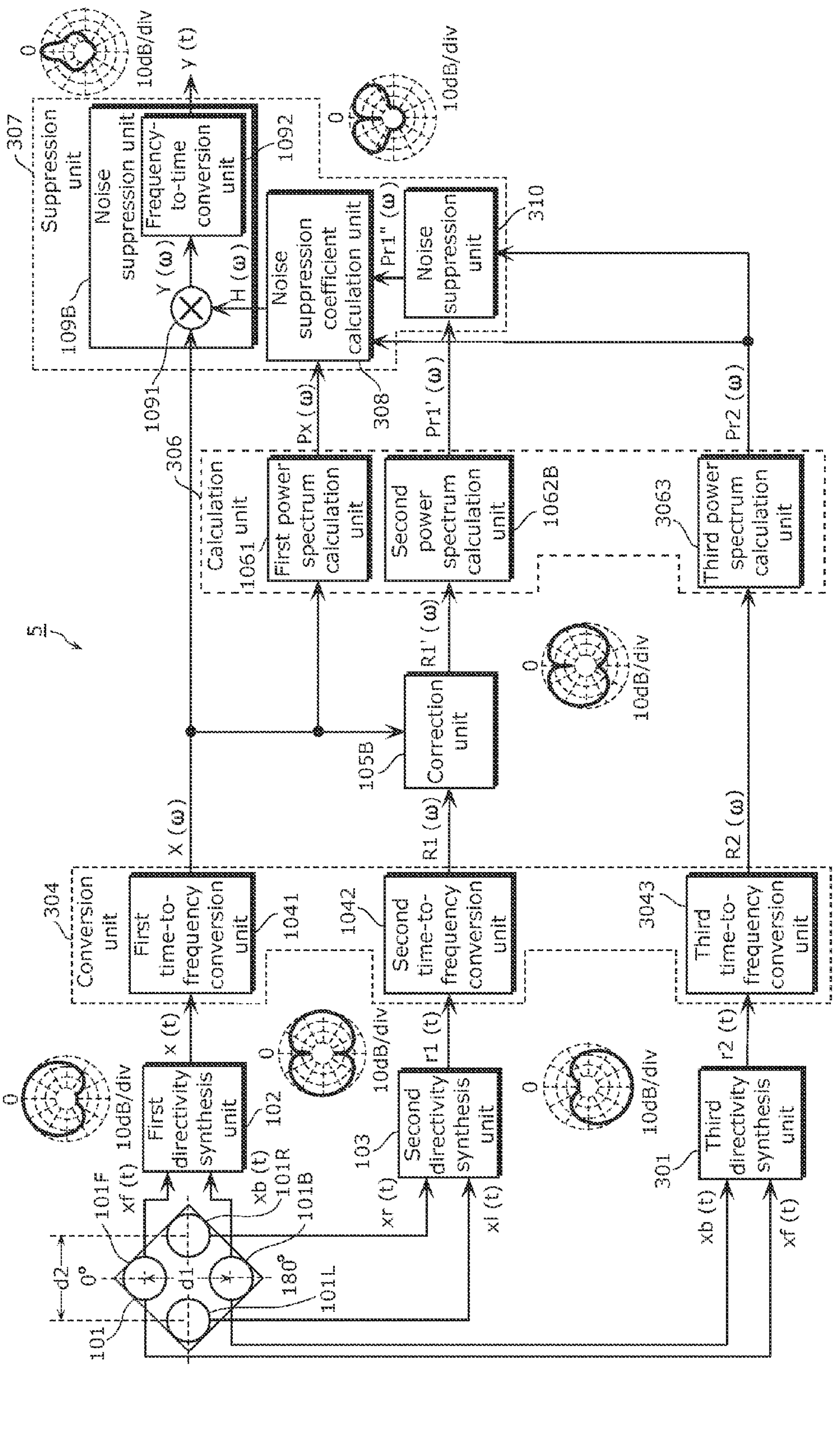
FIG. 18 is a diagram showing an example of a configuration of a directional microphone device according to an embodiment 5.
Figure 19:
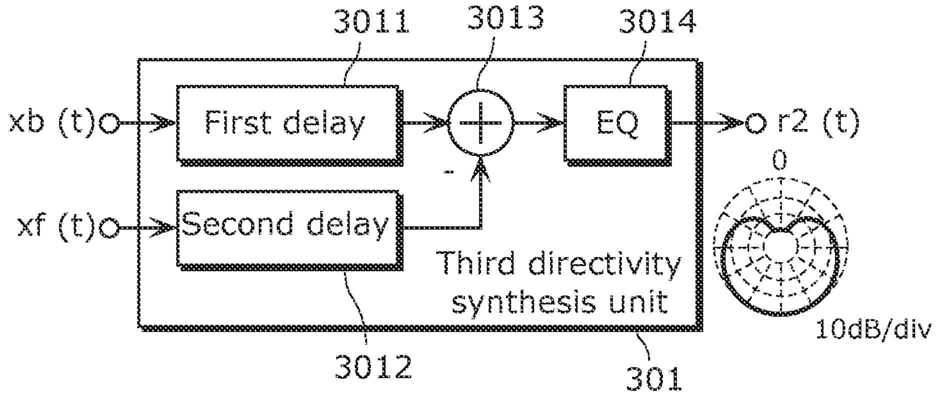
FIG. 19 is a diagram showing an example of a configuration of a third directivity synthesis unit according to the embodiment 5.

FIG. 18 is a diagram showing an example of a configuration of a directional microphone device according to an embodiment 5. FIG. 19 is a diagram showing an example of a configuration of a third directivity synthesis unit according to the embodiment 5. It should be noted that the same reference signs will be used herein to refer to the same components as those shown in FIG. 12 and the description will be omitted.

A directional microphone device 5 shown in FIG. 18 is different from the directional microphone device 3 (FIG. 12) according to the embodiment 3 in configuration that a conversion unit 304, a calculation unit 306, and a suppression unit 307 are provided and a third directivity synthesis unit 301 is added.

Specifically, the conversion unit 304 shown in FIG. 18 is different from the conversion unit 104 shown in FIG. 12 in that the conversion unit 304 is added with a third time-to-frequency conversion unit 3043. The calculation unit 306 shown in FIG. 18 is different from the calculation unit 106B shown in FIG. 12 in that the calculation unit 306 is added with a third power spectrum calculation unit 3063. The suppression unit 307 shown in FIG. 18 is different from the suppression unit 107B shown in FIG. 12 in configuration that a noise suppression coefficient calculation unit 308 is provided and a noise suppression unit 310 is added.

The third directivity synthesis unit 301 processes an output signal of a microphone array 101 to generate a fourth acoustic signal that has a blind spot in sensitivity in a target direction and a directional pattern different from that of a second acoustic signal.

In the present embodiment, using acoustic signals xb (t) and xf (t) respectively from omnidirectional microphone units 1018 and 101F, the third directivity synthesis unit 301 generates an acoustic signal r2 (t) (referred to also as a directional signal r2 (t)) which has directivity having the principal axis in an opposite direction from the target direction, that is, the 180 degree direction. Here, the acoustic signal r2 (t) is a specific example of the fourth acoustic signal.

The third directivity synthesis unit 301, as shown in FIG. 19, includes a first delay 3011, a second delay 3012, a subtractor 3013, and an EQ 3014. The third directivity synthesis unit 301 forms pressure-gradient unidirectivity which has the principal axis of directivity in a direction opposite from that of directivity of an acoustic signal generated by the first directivity synthesis unit 102. In other words, since the signals are input to the third directivity synthesis unit 301, counter to the case where the signals are input to the first directivity synthesis unit 102 shown in FIG. 13, the third directivity synthesis unit 301 forms pressure-gradient unidirectivity which has the principal axis of directivity in an direction opposite from that of directivity of an acoustic signal generated by the first directivity synthesis unit 102. Detailed description is similar to that shown in FIG. 13 and thus omitted.

The conversion unit 304 is by way of example of a first conversion unit. The conversion unit 304 converts a first acoustic signal generated by the first directivity synthesis unit 102, a second acoustic signal generated by a second directivity synthesis unit 103, and the fourth acoustic signal generated by the third directivity synthesis unit 301 into frequency-domain signals.

In the present embodiment, the conversion unit 304 includes a first time-to-frequency conversion unit 1041, a second time-to-frequency conversion unit 1042, and the third time-to-frequency conversion unit 3043. The third time-to-frequency conversion unit 3043 performs a fast Fourier transform, filter bank, wavelet transform, or the like on the output signal r2 (t) of the third directivity synthesis unit 301 to calculate a frequency-domain signal R2 (ω) in the same manner as in the first time-to-frequency conversion unit 1041. It should be noted that the first time-to-frequency conversion unit 1041 and the second time-to-frequency conversion unit 1042 are as described in the embodiment 3, and thus the description thereof will be omitted.

The calculation unit 306 is by way of example of a power spectrum calculation unit. The calculation unit 306 calculates power spectra of the first acoustic signal, the third acoustic signal, and the fourth acoustic signal which are converted into the frequency-domain signals by the conversion unit 304.

In the present embodiment, the calculation unit 306 includes a first power spectrum calculation unit 1061, a second power spectrum calculation unit 1062B, and the third power spectrum calculation unit 3063. The third power spectrum calculation unit 3063 calculates a power spectrum Pr2 (ω) of a signal R2 (ω) which is the output signal of the third time-to-frequency conversion unit 3043. Here, for example, the third power spectrum calculation unit 3063 calculates the power spectrum Pr2 (ω), using the equation indicated in (Eq. 20).

[Math. 10]

$$Pr2(\omega)=R2^2(\omega) \quad \text{(Eq. 20)}$$

It should be noted that the first power spectrum calculation unit 1061 and the second power spectrum calculation unit 1062B are as described in the embodiment 3, and thus the description will be omitted.

The noise suppression unit 310 is by way of example of a counter-direction noise suppression unit. Using the third acoustic signal generated by the correction unit 105B as a main signal and the fourth acoustic signal generated by a third directivity synthesis unit 301 as a reference signal, the noise suppression unit 310 suppresses a first noise which is sound included in the third acoustic signal and is from an opposite direction from the target direction. For example, the noise suppression unit 310 suppresses the first noise, using a power spectrum of the third acoustic signal as the main signal and a power spectrum of the fourth acoustic signal as the reference signal.

In the present embodiment, using a power spectrum Pr1' (ω), which is an output signal of the second power spectrum calculation unit 1062B, as the main signal and the power spectrum Pr2 (ω), which is the output signal of the third power spectrum calculation unit 3063, as the reference signal, the noise suppression unit 310 suppress a rear noise about the 180 degree direction from the power spectrum Pr1' (ω), which is the main signal, to calculate a power spectrum Pr1'' (ω) which is an output signal.

For example, the noise suppression unit 310 calculates the power spectrum Pr1'' (ω), which is the output signal, using the equation indicated in (Eq. 21).

[Math. 11]

$$Pr1''(\omega)=Rr1'(\omega)-\alpha(\omega)\cdot Pr2(\omega) \qquad \text{(Eq. 21)}$$

where α' (ω) is a weighting factor. Similarly to a weighting factor α (ω) which is calculated by the noise suppression coefficient calculation unit 308, for example, the method disclosed in PTL 1 or 3 may be used to calculate the weighting factor α' (ω). Thus, detailed description is omitted.

Compared with the noise suppression coefficient calculation unit 108B shown in FIG. 12, the noise suppression coefficient calculation unit 308 is different in that the number of reference signals to be used by the noise suppression coefficient calculation unit 108B is increased. In other words, the noise suppression coefficient calculation unit 308 performs processing of extending the reference signal used by the noise suppression coefficient calculation unit 108B to a plurality of channels.

Using the first acoustic signal, the fourth acoustic signal, and the output signal of the noise suppression unit 310, the noise suppression coefficient calculation unit 308 calculates a noise suppression coefficient for suppressing noise which includes the first noise and is sound that is included in the first acoustic signal and other than sound from the target direction. The noise suppression coefficient calculation unit 308 calculates the noise suppression coefficient, using the power spectrum of the first acoustic signal as a main signal and the output signal of the noise suppression unit 310 and the power spectrum of the fourth acoustic signal as reference signals.

In the present embodiment, using an output signal Px (ω) of the first power spectrum calculation unit 1061 as a main signal and the output signal Pr1'' (ω) of the noise suppression unit 310 and the power spectrum Pr2 (ω), which is the output signal of the third power spectrum calculation unit 3063, as reference signals, the noise suppression coefficient calculation unit 308 calculates a coefficient H (ω) for suppressing, from the power spectrum Px (ω) which is the main signal, noise which is sound from the directions other than the target direction.

The noise suppression coefficient calculation unit 308 calculates the noise suppression coefficient H (ω), using the equation indicated in (Eq. 22), for example. It should be noted that (Eq. 22) is by way of example of equation for calculating the noise suppression coefficient H (ω), and is an equation having Wiener filter characteristics.

[Math. 12]

$$H(\omega)=\frac{Px(\omega)-a1(\omega)\cdot Pr1''(\omega)-a2(\omega)\cdot Pr2(\omega)}{Px(\omega)} \qquad \text{(Eq. 22)}$$

where α1 (ω) and α2 (ω) are weighting factors. Similarly to the weighting factor α (ω) which is calculated by the noise suppression coefficient calculation unit 108B, for example, the method disclosed in PTL 1 or 3 may be used to calculate the weighting factors α1 (ω) and α2 (ω). Thus, detailed description is omitted.

As described above, according to the present embodiment, the directional microphone device and acoustic signal processing method that can form the directivity having a narrow directional angle in the target direction can be implemented.

The present embodiment, compared with the embodiments 3 and 4, further permits calculation of the reference signal by directions, thereby estimating noises arriving from a greater number of directions. This allows an acoustic signal that has the directivity having a narrow directional angle to be accurately formed in the target direction.

While the directional microphone device according to one or more aspects of the present invention has been described with reference to the embodiments, the present invention is not limited to the embodiments. Various modifications to the present embodiments that may be conceived by those skilled in the art or combinations of the components of different embodiments are intended to be included within the scope of one or more aspects of the invention, without departing from the spirit of the present invention.

Figure 20:
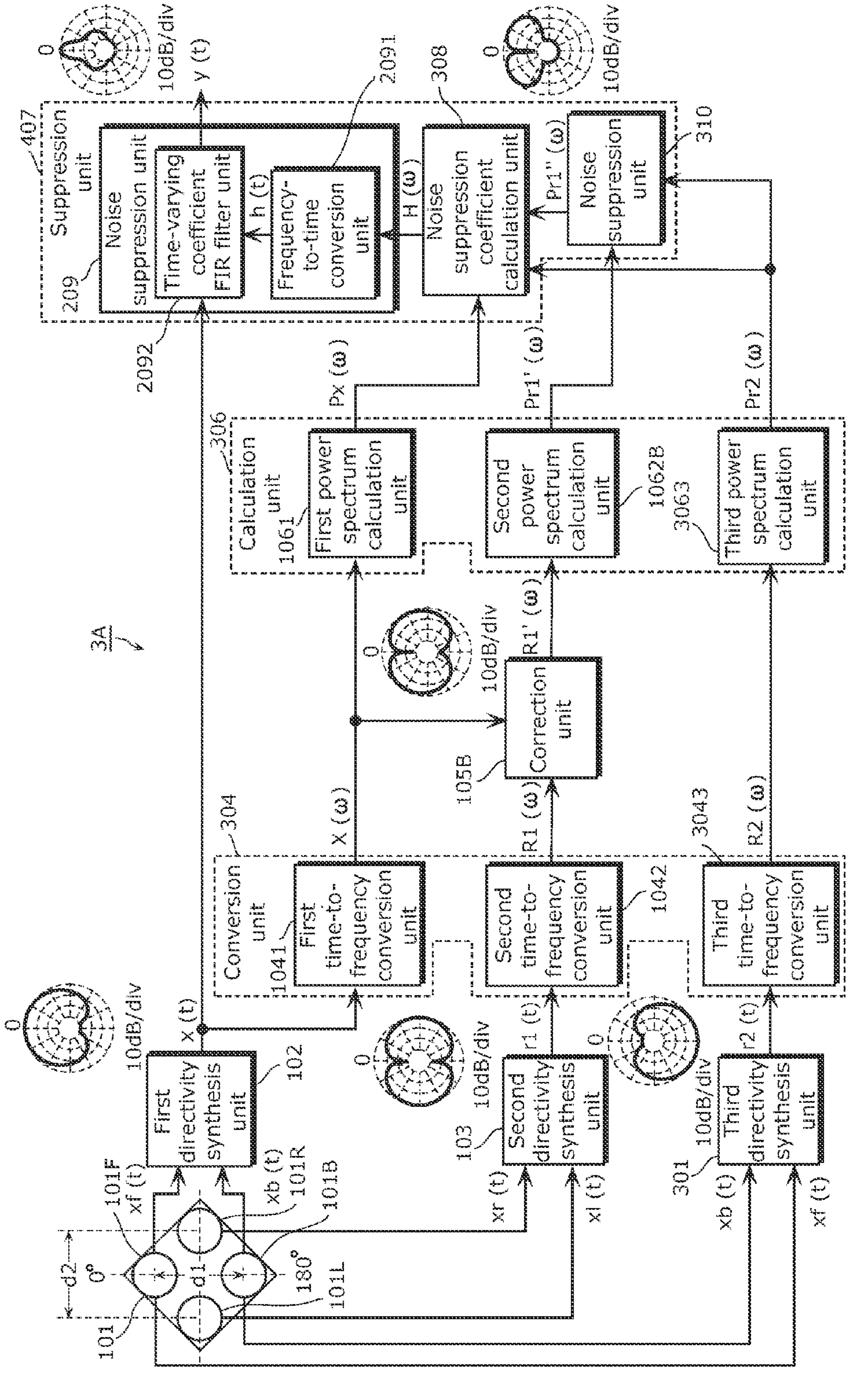
FIG. 20 is a diagram showing an example of a variation of the configuration of the directional microphone device according to the embodiment 5.

For example, the configurations of the directional microphone devices according to the embodiments 4 and 5 may be combined. An example of this case will be described below, with reference to FIG. 20. FIG. 20 is a diagram showing a variation of the configuration of the directional microphone device 3A according to the embodiment 5. It should be noted that the same reference signs will be used in FIG. 20 to refer to the same components as those shown in FIGS. 17 and 18, and thus the description is not repeated.

According to the above configuration, a reference signal a direction by direction is calculated and the noise suppression unit 310 performs a noise suppression process, thereby allowing noises arriving from a plurality of directions to be estimated and a filter coefficient calculated across frames to be updated in a short time scale. This can not only accurately form an acoustic signal that has the directivity having a narrow directional angle in the target direction but also allows fine control of sound quality of an output acoustic signal.

As described above, the plurality of embodiments have been described as illustration of the technology disclosed in the present application. However, the technology of the present invention is not limited thereto and applicable to embodiments to which modifications, permutations, additions and omissions are made accordingly. Moreover, a new embodiment is possible by a combination of the components described in the above embodiments.

Moreover, the present disclosure includes the following variations as well.

(1) The components included in each of the devices described above, except for the microphones, are implemented in, specifically, a computer system which includes a microprocessor, a read only memory (ROM), a random access memory (RAM), for example. The RAM stores a computer program. By the microprocessor operating in accordance with the computer program, each device achieves its function. Here, the computer program is, to achieve predetermined functionality, configured in combination of a plurality of instruction codes indicating instructions to the computer.

(2) Part or the whole of the components included in each of the devices described above, except for the microphones, may be configured with one system LSI (Large Scale Integration). The system LSI is a super multi-function LSI fabricated by integrating a plurality of components on one chip, and is, specifically, a computer system which includes a microprocessor, a ROM, a RAM, or the like. The RAM stores the computer program. The system LSI performs its functionality by the microprocessor operating in accordance with the computer program.

(3) Part or the whole of the components included in each of the devices described above, except for the microphones, may be configured with an IC (Integrated Circuit) card or a single module detachable to each device. The IC card or the module is a computer system which includes a microprocessor, a ROM, a RAM, or the like. The IC card or the module may include the super multi-function LSI described above. The IC card or the module achieves its functionality by the microprocessor operating in accordance with the computer program. The IC card or the module may be of tamper-resistant.

(4) The present invention does not necessarily include a microphone. An output signal may be received from a microphone as an external device, and using the received output signal, the first acoustic signal that has the sensitivity in the target direction and the second acoustic signal that has the blind spot in sensitivity in the target direction may be generated. In other words, the directional microphone device according to the present invention may include a first directivity synthesis unit which generates a first acoustic signal having sensitivity in a target direction; a second directivity synthesis unit which generates a second acoustic signal having a blind spot in sensitivity in the target direction; a correction unit which multiplies, in a frequency domain, the second acoustic signal generated by the second directivity synthesis unit by the first acoustic signal generated by the first directivity synthesis unit N times, to generate a third acoustic signal having a narrower angular range of the blind spot in sensitivity in the target direction than the second acoustic signal, where the N is greater than zero; and a suppression unit which performs noise suppression using the first acoustic signal generated by the first directivity synthesis unit as a main signal and the third acoustic signal generated by the correction unit as a reference signal to generate an output acoustic signal which is the first acoustic signal that has narrowed directivity in the target direction.

(5) The present invention may be implemented in the methods described above. Moreover, the present invention may be achieved in a computer program implementing such methods via a computer, or may be implemented as digital signals including the computer program.

In other words, the program may program may cause a computer to execute: (a) generating a first acoustic signal having sensitivity in a target direction; (b) generating a second acoustic signal having a blind spot in sensitivity in the target direction; (c) multiplying, in a frequency domain, the second acoustic signal generated in step (b) by the first acoustic signal generated in step (a) N times, to generate a third acoustic signal having a narrower angular range of the blind spot in sensitivity in the target direction than the second acoustic signal, where the N is greater than zero; and (d) performing noise suppression using the first acoustic signal generated in step (a) as a main signal and the third acoustic signal generated in step (c) as a reference signal to generate an output acoustic signal which is the first acoustic signal that has narrowed directivity in the target direction.

Moreover, the present invention may be implemented in a computer-readable recording medium having stored therein a computer program or a digital signal, for example, a flexible disk, a hard disk, a compact disc read only memory (CD-ROM), a magneto-optical disc (MO), a digital versatile disc (DVD), a DVD-ROM, a DVD-RAM, a BD (Blu-ray (registered trademark) Disc), or a semiconductor memory. Moreover, the present invention may be the digital signal stored in these recording media. Moreover, the present invention may be the computer program or the digital signal transmitted via an electric communication line, a wireless or wired communication line, a network represented by the Internet, data broadcast, or the like. Moreover, the present invention may be implemented in a computer system which includes a microprocessor and a memory, wherein the memory stores the computer program and the microprocessor operates in accordance with the computer program. Moreover, by transferring the program or the digital signal stored in the non-transitory recording medium, or transferring the program or the digital signal via the network or the like, the program or the digital signal may be executed in another independent computer system.

(6) The above embodiments may be combined.

While in each of the above-described embodiments, a plurality of directional signals are generated using a microphone array and a plurality of directivity synthesis units, it should be noted that output of a plurality of directional microphones disposed in close proximity may be used instead.

As the above, the embodiments have been described by way of example of the technology of the present invention. To this extent, the accompanying drawings and detailed description are provided.

Thus, the components set forth in the accompanying drawings and detailed description include not only components essential to solve the problems but also components unnecessary to solve the problems but for illustrating the above technology. Thus, those unnecessary components should not be acknowledged essential due to the mere fact that the unnecessary components are depicted in the accompanying drawings or set forth in the detailed description.

The above embodiments illustrate the technology of the present invention, and thus various modifications, permutations, additions, and omissions are possible in the scope of the appended claims and the equivalents thereof.

INDUSTRIAL APPLICABILITY

The present invention can be used for directional microphone devices, acoustic signal processing methods, and programs, and, in particular, for a directional microphone device, acoustic signal processing method, and program that are applicable to, for example, video cameras, hearing aid, in-vehicle microphones, and TVs, which pick up sound in a particular direction, and application installed in mobile terminals which pick up sound in a particular direction using a microphone as an external device.

REFERENCE SIGNS LIST

1, 1A, 2, 3, 3A, 4, 5 Directional microphone device
11 First microphone
12 Second microphone
101 Microphone array
101L, 101R, 101F, 101B Omnidirectional microphone unit
102 First directivity synthesis unit
103 Second directivity synthesis unit
104, 304 Conversion unit
105, 105A, 105B, 105C Correction unit
106, 106A, 106B, 306 Calculation unit
107, 107A, 107B, 207, 307 Suppression unit
108, 108A, 108B Noise suppression coefficient calculation unit
109, 109A Noise suppression processing unit
109B, 209, 310 Noise suppression unit

110 First coefficient multiplication unit
111 First subtractor unit
200 Beam-width control unit
301 Third directivity synthesis unit
308 Noise suppression coefficient calculation unit
901 First microphone unit
902 Second microphone unit
910 Determination unit
920 Adaptive filter unit
930 Signal subtraction unit
940 Noise suppression filter coefficient calculation unit
950 Time-varying coefficient filter unit
1021, 3011 First delay
1022, 3012 Second delay
1023, 1031, 3013 Subtractor
1024, 1032, 3014 EQ
1041 First time-to-frequency conversion unit
1042 Second time-to-frequency conversion unit
1050 Operation unit
1051 Spectral multiplication unit
1052, 1054, 1055 Absolute value operation unit
1056 Multiplier unit
1053, 1057 Square root calculation unit
1061 First power spectrum calculation unit
1062, 1062A, 1062B Second power spectrum calculation unit
1091 Multiplier
1092 Frequency-to-time conversion unit
2091 Frequency-to-time conversion unit
2092 Time-varying coefficient FIR filter unit
3043 Third time-to-frequency conversion unit
3063 Third power spectrum calculation unit

The invention claimed is:

1. A directional microphone device, comprising:

a first directivity synthesis unit configured to generate a first acoustic signal having sensitivity in a target direction;

a second directivity synthesis unit configured to generate a second acoustic signal having a blind spot in sensitivity in the target direction;

a correction unit configured to multiply, in a frequency domain, the second acoustic signal generated by the second directivity synthesis unit by the first acoustic signal generated by the first directivity synthesis unit N times, to generate a third acoustic signal having a narrower angular range of the blind spot in sensitivity in the target direction than the second acoustic signal, where the N is greater than zero; and a suppression unit configured to perform noise suppression using the first acoustic signal generated by the first directivity synthesis unit as a main signal and the third acoustic signal generated by the correction unit as a reference signal to generate an output acoustic signal which is the first acoustic signal that has narrowed directivity in the target direction.

2. The directional microphone device according to claim 1, wherein the first directivity synthesis unit and the second directivity synthesis unit are configured to process an output signal of a microphone array including a plurality of microphones to generate the first acoustic signal and the second acoustic signal, respectively.

3. The directional microphone device according to claim 1, further comprising a first conversion unit configured to convert the first acoustic signal generated by the first directivity synthesis unit and the second acoustic signal generated by the second directivity synthesis unit into frequency-domain signals, wherein the correction unit is configured to multiply the second acoustic signal converted by the first conversion unit into the frequency-domain signal by the first acoustic signal converted by the first conversion unit into the frequency-domain signal the N times, to generate the third acoustic signal, where the N is greater than zero.

4. The directional microphone device according to claim 3, further comprising a power spectrum calculation unit configured to calculate a power spectrum of the first acoustic signal converted into the frequency-domain signal and a power spectrum of the third acoustic signal, wherein the suppression unit is configured to perform the noise suppression using one of the first acoustic signal and the first acoustic signal converted by the first conversion unit into the frequency-domain signal and the power spectrum of the first acoustic signal calculated by the power spectrum calculation unit as main signals and the power spectrum of the third acoustic signal calculated by the power spectrum calculation unit as a reference signal, to generate the output acoustic signal.

5. The directional microphone device according to claim 4, wherein the power spectrum calculation unit is configured to raise an absolute value of the third acoustic signal generated by the correction unit to a power of (2/(N +1)) to calculate the power spectrum of the third acoustic signal.

6. The directional microphone device according to claim 5, further comprising a beam-width control unit configured to change the N, which is the number of times of multiplication performed by the correction unit, and a value of the N in the power of (2/(N +1)) used by the power spectrum calculation unit, to control directivity of the directional microphone device.

7. The directional microphone device according to claim 4, wherein the suppression unit includes:

a first coefficient multiplication unit configured to multiply the power spectrum of the third acoustic signal by a predetermined coefficient to output as an output signal;

a first subtractor unit configured to subtract the output signal of the first coefficient multiplication unit from the power spectrum of the first acoustic signal;

a noise suppression coefficient calculation unit configured to calculate a noise suppression coefficient for suppressing noise included in the first acoustic signal, using the power spectrum of the first acoustic signal and an output signal of the first subtractor unit as input, the noise being sound from directions other than the target direction; and a noise suppression processing unit configured to perform the noise suppression, using, as input, one of the first acoustic signal and the first acoustic signal converted by the first conversion unit into the frequency-domain signals and the noise suppression coefficient calculated by the noise suppression coefficient calculation unit, to generate the output acoustic signal.

8. The directional microphone device according to claim 4, wherein the N is a real number greater than zero.

9. The directional microphone device according to claim 1, wherein the N is 1, and the correction unit includes:

a spectral multiplication unit configured to complex multiply the second acoustic signal converted into a frequency-domain signal by the first acoustic signal converted into a frequency-domain signal;

an absolute value operation unit configured to calculate an absolute value of an output signal of the spectral multiplication unit; and a square root calculation unit configured to calculate a square root of the absolute value calculated by the absolute value operation unit, to generate the third acoustic signal.

10. The directional microphone device according to claim 1, wherein the N is 1, and the correction unit includes:

an absolute value operation unit configured to calculate a first absolute value of the first acoustic signal converted into a frequency-domain signal and a second absolute value of the second acoustic signal converted into a frequency-domain signal;

a multiplier unit configured to multiply the first absolute value and the second absolute value calculated by the absolute value operation unit; and a square root calculation unit configured to calculate a square root of a multiplication value which is obtained by the multiplier unit multiplying the first absolute value and the second absolute value, to generate the third acoustic signal.

11. The directional microphone device according to claim 1, wherein the suppression unit includes:

a noise suppression coefficient calculation unit configured to calculate a noise suppression coefficient for suppressing noise included in the first acoustic signal, using power spectra of the first acoustic signal and the third acoustic signal, the noise being sound from directions other than the target direction; and a noise suppression unit configured to perform the noise suppression which includes applying the noise suppression coefficient calculated by the noise suppression coefficient calculation unit to the first acoustic signal generated by the first directivity synthesis unit to suppress the noise and extracting only sound from the target direction, to generate the output acoustic signal.

12. The directional microphone device according to claim 11, further comprising a power spectrum calculation unit configured to calculate a power spectrum of the first acoustic signal converted into the frequency-domain signal and a power spectrum of the third acoustic signal, wherein the noise suppression coefficient calculation unit is configured to calculate the noise suppression coefficient, using the power spectrum of the first acoustic signal calculated by the power spectrum calculation unit as a main signal and the power spectrum of the third acoustic signal calculated by the power spectrum calculation unit as a reference signal.

13. The directional microphone device according to claim 11, wherein the noise suppression unit includes:

a multiplier which multiplies the first acoustic signal converted into a frequency-domain signal by the noise suppression coefficient calculated by the noise suppression coefficient calculation unit to extract only a target acoustic signal in the target direction from which the noise has been suppressed; and an inverse Fourier transform unit configured to convert the target acoustic signal extracted by the multiplier into a time-domain signal to generate the output acoustic signal.

14. The directional microphone device according to claim 11, wherein the noise suppression unit includes:

a second conversion unit configured to convert the noise suppression coefficient, which is a frequency-domain coefficient, into a time-domain coefficient of an FIR filter; and a time-varying coefficient FIR filter unit configured to update the time-domain coefficient of the FIR filter converted by the second conversion unit one unit of time prior, with the coefficient of the FIR filter converted by the second conversion unit at a current unit of time, and filter the first acoustic signal generated by the first directivity synthesis unit, to generate the output acoustic signal.

15. The directional microphone device according to claim 1, further comprising a third directivity synthesis unit configured to generate a fourth acoustic signal having a blind spot in sensitivity in the target direction and a directional pattern different from the second acoustic signal, wherein the suppression unit further includes:

a counter-direction noise suppression unit configured to suppress a first noise included in the third acoustic signal, using the third acoustic signal generated by the correction unit as a main signal and the fourth acoustic signal generated by the third directivity synthesis unit as a reference signal, the first noise being sound in a direction opposite from the target direction;

a noise suppression coefficient calculation unit configured to calculate a noise suppression coefficient for suppressing noise, including the first noise, using the first acoustic signal, the fourth acoustic signal, and an output signal of the counter-direction noise suppression unit, the noise being sound from directions other than the target direction; and a noise suppression unit configured to perform the noise suppression which includes applying the noise suppression coefficient calculated by the noise suppression coefficient calculation unit to the first acoustic signal generated by the first directivity synthesis unit to suppress the noise and extracting only sound from the target direction, to generate the output acoustic signal.

16. The directional microphone device according to claim 15, further comprising:

a first conversion unit configured to convert the first acoustic signal generated by the first directivity synthesis unit, the second acoustic signal generated by the second directivity synthesis unit, and the fourth acoustic signal generated by the third directivity synthesis unit into frequency-domain signals; and a power spectrum calculation unit configured to calculate power spectra of the first acoustic signal, the third acoustic signal, and the fourth acoustic signal converted by the first conversion unit into the frequency-domain signals, wherein the counter-direction noise suppression unit is configured to suppress the first noise, using the power spectrum of the third acoustic signal as a main signal and the power spectrum of the fourth acoustic signal as a reference signal.

17. The directional microphone device according to claim 16, wherein the noise suppression coefficient calculation unit is configured to calculate the noise suppression coefficient, using the power spectrum of the first acoustic signal as a main signal and the output signal of the counter-direction noise suppression unit and the power spectrum of the fourth acoustic signal as reference signals.

18. An acoustic signal processing method, comprising:

(a) generating a first acoustic signal having sensitivity in a target direction;

(b) generating a second acoustic signal having a blind spot in sensitivity in the target direction;

(c) multiplying, in a frequency domain, the second acoustic signal generated in step (b) by the first acoustic signal generated in step (a) N times, to generate a third acoustic signal having a narrower angular range of the blind spot in sensitivity in the target direction than the second acoustic signal, where the N is greater than zero; and (d) performing noise suppression using the first acoustic signal generated in step (a) as a main signal and the third acoustic signal generated in step (c) as a reference signal to generate an output acoustic signal which is the first acoustic signal that has narrowed directivity in the target direction.

19. A non-transitory computer-readable recording medium storing a program for performing an acoustic signal processing method, the program causing a computer to execute:

(a) generating a first acoustic signal having sensitivity in a target direction;

(b) generating a second acoustic signal having a blind spot in sensitivity in the target direction;

(c) multiplying, in a frequency domain, the second acoustic signal generated in step (b) by the first acoustic signal generated in step (a) N times, to generate a third acoustic signal having a narrower angular range of the blind spot in sensitivity in the target direction than the second acoustic signal, where the N is greater than zero; and (d) performing noise suppression using the first acoustic signal generated in step (a) as a main signal and the third acoustic signal generated in step (c) as a reference signal to generate an output acoustic signal which is the first acoustic signal that has narrowed directivity in the target direction.

* * * * *